US012706792B2

(12) United States Patent
Saggar et al.

(10) Patent No.: US 12,706,792 B2
(45) Date of Patent: Aug. 11, 2026

(54) RESOURCE QUANTIZATION FOR GUARD INTERVAL (GI)-BASED WAVEFORMS

(71) Applicant: QUALCOMM Incorporated, San Diego, CA (US)

(72) Inventors: Hemant Saggar, San Diego, CA (US); Jing Sun, San Diego, CA (US); Iyab Issam Sakhnini, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 433 days.

(21) Appl. No.: 18/458,685

(22) Filed: Aug. 30, 2023

(65) Prior Publication Data

US 2025/0080386 A1 Mar. 6, 2025

(51) Int. Cl.
*H04L 27/26* (2006.01)

(52) U.S. Cl.
CPC ................................ *H04L 27/2605* (2013.01)

(58) Field of Classification Search
CPC ............. H04L 27/2605; H04L 27/2602; H04L 27/26025; H04L 27/2646
See application file for complete search history.

(56) References Cited

U.S. PATENT DOCUMENTS 9,374,197 B2 * 6/2016 Teplitsky .......... H04W 56/0035
10,349,388 B2 * 7/2019 Chun .................... H04L 5/0053
10,367,672 B2 * 7/2019 Akkarakaran ...... H04L 27/2613
10,728,799 B2 * 7/2020 Chun ...................... H04L 69/04
10,778,493 B2 * 9/2020 Akkarakaran ...... H04L 27/2613
11,502,889 B2 * 11/2022 Akkarakaran ........ G01S 13/346
11,616,671 B1 * 3/2023 Sakhnini ........... H04L 27/26025 375/262
11,870,627 B2 * 1/2024 Zhang ................. H04L 27/2607
12,074,746 B2 * 8/2024 Sakhnini ............. H04L 27/2602
12,262,332 B2 * 3/2025 Saggar .................. H04W 52/36
12,348,346 B2 * 7/2025 Saggar ................ H04L 27/2646
12,348,347 B2 * 7/2025 Saggar .................. H04L 1/0003
12,476,854 B2 * 11/2025 Sakhnini ............. H04L 27/2607
2015/0280862 A1 * 10/2015 Teplitsky ................. H04B 1/30 375/319
2017/0070914 A1 * 3/2017 Chun ...................... H04W 4/70
(Continued)

FOREIGN PATENT DOCUMENTS

EP 4572265 A1 * 6/2025 ......... H04L 27/2607
WO WO-2024173489 A1 * 8/2024 ......... H04L 27/2605
WO WO-2024237996 A1 * 11/2024 ....... H04L 25/03343

*Primary Examiner* — Jay P Patel
(74) *Attorney, Agent, or Firm* — Holland & Hart LLP

(57) ABSTRACT

Methods, systems, and devices for wireless communications are described. A user equipment (UE) may receive, from a network entity, one or more first signals that indicate a resource allocation and that indicate a set of guard interval (GI)-based waveform parameters for a GI-based waveform associated with the UE. The UE may receive, from the network entity, an indication of one or more quantized resource allocation parameters associated with the GI-based waveform. The indication may include one or more formulas for determination of the one or more quantized resource allocation parameters, the one or more quantized resource allocation parameters, or both. The UE may communicate the GI-based waveform with the network entity using the one or more quantized resource allocation parameters and the set of GI-based waveform parameters.

30 Claims, 16 Drawing Sheets

(56) References Cited

U.S. PATENT DOCUMENTS

| | | | | |
|---|---|---|---|---|
| 2017/0079027 | A1* | 3/2017 | Chun | H04W 72/541 |
| 2018/0091350 | A1* | 3/2018 | Akkarakaran | G01S 13/346 |
| 2019/0296955 | A1* | 9/2019 | Akkarakaran | H04L 27/2613 |
| 2019/0342885 | A1* | 11/2019 | Chun | H04W 72/541 |
| 2019/0364560 | A1* | 11/2019 | Chun | H04W 4/70 |
| 2020/0119797 | A1* | 4/2020 | Wang | H04B 7/0632 |
| 2020/0412592 | A1* | 12/2020 | Akkarakaran | H04L 5/0048 |
| 2021/0337537 | A1* | 10/2021 | Chun | H04L 1/0075 |
| 2023/0053650 | A1* | 2/2023 | Zhang | H04L 27/2636 |
| 2023/0135780 | A1* | 5/2023 | Sakhnini | H04L 27/2602 370/329 |
| 2023/0140287 | A1* | 5/2023 | Sakhnini | H04L 5/0048 370/336 |
| 2023/0142451 | A1* | 5/2023 | Gao | H04L 5/0048 |
| 2023/0318892 | A1* | 10/2023 | Sakhnini | H04L 27/2613 370/329 |
| 2024/0129083 | A1* | 4/2024 | Sakhnini | H04W 72/0446 |
| 2024/0195547 | A1* | 6/2024 | Sakhnini | H04L 27/2636 |
| 2024/0204953 | A1* | 6/2024 | Go | H04B 7/0408 |
| 2024/0275652 | A1* | 8/2024 | Saggar | H04L 27/2646 |
| 2024/0380645 | A1* | 11/2024 | Saggar | H04L 25/03343 |
| 2025/0080386 | A1* | 3/2025 | Saggar | H04L 27/2602 |

* cited by examiner 300-a 300-b

RESOURCE QUANTIZATION FOR GUARD INTERVAL (GI)-BASED WAVEFORMS

FIELD OF TECHNOLOGY

The following relates to wireless communications, including resource quantization for GI-based waveforms.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). A wireless device may communicate using a guard interval (GI)-based waveform.

SUMMARY

The described techniques relate to improved methods, systems, devices, and apparatuses that support resource quantization for GI-based waveforms. For example, the described techniques provide for receiving, at a UE, a resource allocation and a set of guard interval (GI)-based waveform parameters associated with a GI-based waveform from a network entity. The UE may also receive an indication of quantized resource allocation parameters associated with the GI-based waveform. For example, the indication of quantized resource allocation parameters may include the one or more quantized resource allocation parameters (e.g., determined by the network entity), or one or more formulas for determination of the quantized resource allocation parameters (e.g., by the UE). The UE and the network entity may communicate the GI-based waveform using the quantized resource allocation parameters (e.g., determined by the UE, the network entity, or both) and the set of GI-based waveform parameters.

A method for wireless communications by a UE is described. The method may include receiving, from a network entity, one or more first signals that indicate a resource allocation and that indicate a set of GI-based waveform parameters for a GI-based waveform associated with the UE, receiving, from the network entity, an indication of one or more quantized resource allocation parameters associated with the GI-based waveform, and communicating the GI-based waveform with the network entity using the one or more quantized resource allocation parameters and the set of GI-based waveform parameters.

A UE for wireless communications is described. The UE may include one or more memories storing processor executable code, and one or more processors coupled with the one or more memories. The one or more processors may individually or collectively operable to execute the code to cause the UE to receive, from a network entity, one or more first signals that indicate a resource allocation and that indicate a set of GI-based waveform parameters for a GI-based waveform associated with the UE, receive, from the network entity, an indication of one or more quantized resource allocation parameters associated with the GI-based waveform, and communicate the GI-based waveform with the network entity using the one or more quantized resource allocation parameters and the set of GI-based waveform parameters.

Another UE for wireless communications is described. The UE may include means for receiving, from a network entity, one or more first signals that indicate a resource allocation and that indicate a set of GI-based waveform parameters for a GI-based waveform associated with the UE, means for receiving, from the network entity, an indication of one or more quantized resource allocation parameters associated with the GI-based waveform, and means for communicating the GI-based waveform with the network entity using the one or more quantized resource allocation parameters and the set of GI-based waveform parameters.

A non-transitory computer-readable medium storing code for wireless communications is described. The code may include instructions executable by a processor to receive, from a network entity, one or more first signals that indicate a resource allocation and that indicate a set of GI-based waveform parameters for a GI-based waveform associated with the UE, receive, from the network entity, an indication of one or more quantized resource allocation parameters associated with the GI-based waveform, and communicate the GI-based waveform with the network entity using the one or more quantized resource allocation parameters and the set of GI-based waveform parameters.

In some examples of the method, UEs, and non-transitory computer-readable medium described herein, the indication includes a configuration that indicates one or more formulas for determination of the one or more quantized resource allocation parameters.

In some examples of the method, UEs, and non-transitory computer-readable medium described herein, communicating the GI-based waveform with the network entity may include operations, features, means, or instructions for communicating the GI-based waveform with the network entity using the one or more quantized resource allocation parameters that may be determined based on the one or more formulas indicated by the configuration.

In some examples of the method, UEs, and non-transitory computer-readable medium described herein, receiving the indication may include operations, features, means, or instructions for receiving a message including the one or more quantized resource allocation parameters associated with the GI-based waveform.

Some examples of the method, UEs, and non-transitory computer-readable medium described herein may further include operations, features, means, or instructions for receiving, from the network entity, an indication of one or more second quantized resource allocation parameters associated with the GI-based waveform, where the one or more second quantized resource parameters may be different from the one or more resource allocation parameters.

Some examples of the method, UEs, and non-transitory computer-readable medium described herein may further include operations, features, means, or instructions for transmitting, to the network entity, one or more messages requesting one or more third quantized resource allocation parameters, where the indication of the one or more second quantized resource allocation parameters may be received in response to the one or more messages.

Some examples of the method, UEs, and non-transitory computer-readable medium described herein may further include operations, features, means, or instructions for transmitting, to the network entity, one or more messages indicating an incompatibility for the one or more quantized resource allocation parameters, where the indication of the one or more second quantized resource allocation parameters may be received in response to the one or more messages.

In some examples of the method, UEs, and non-transitory computer-readable medium described herein, the one or more quantized resource allocation parameters include one or more GI length parameters, one or more SS length parameters, or a combination thereof, where the one or more quantized resource allocation parameters may be quantized according to a quantization grid.

Some examples of the method, UEs, and non-transitory computer-readable medium described herein may further include operations, features, means, or instructions for receiving one or more signals that indicate a head GI length in a time domain, a tail GI length in the time domain, or both.

Some examples of the method, UEs, and non-transitory computer-readable medium described herein may further include operations, features, means, or instructions for receiving one or more signals indicating a head SS length in a time domain or a pre-transform domain, a tail SS length in the time domain or the pre-transform domain, or both.

Some examples of the method, UEs, and non-transitory computer-readable medium described herein may further include operations, features, means, or instructions for determining an allocation of one or more resource blocks or one or more tones based on a quantization of the one or more GI length parameters, of the one or more SS length parameters, or of both.

Some examples of the method, UEs, and non-transitory computer-readable medium described herein may further include operations, features, means, or instructions for determining a data allocation of one or more resource blocks or one or more tones based on a difference between the allocation and the quantized one or more GI length parameters, the quantized one or more SS length parameters, or both.

In some examples of the method, UEs, and non-transitory computer-readable medium described herein, the quantization of the one or more GI length parameters, of the one or more SS length parameters, or of both may be based on a rounding based quantization, a deviation based quantization, or a combination thereof.

In some examples of the method, UEs, and non-transitory computer-readable medium described herein, the quantization of the one or more GI length parameters, of the one or more SS length parameters, or of both may be based on a modulation and coding scheme, a symbol type, a delay spread, an allocated bandwidth, an error target, a throughput target, or a combination thereof.

A method for wireless communications by a network entity is described. The method may include transmitting, to a UE, one or more first signals that indicate a resource allocation and that indicate a set of GI-based waveform parameters for a GI-based waveform associated with the UE, transmitting, to the UE, an indication of one or more quantized resource allocation parameters associated with the GI-based waveform, and communicating the GI-based waveform with the UE using the one or more quantized resource allocation parameters and the set of GI-based waveform parameters.

A network entity for wireless communications is described. The network entity may include one or more memories storing processor executable code, and one or more processors coupled with the one or more memories. The one or more processors may individually or collectively operable to execute the code to cause the network entity to transmit, to a UE, one or more first signals that indicate a resource allocation and that indicate a set of GI-based waveform parameters for a GI-based waveform associated with the UE, transmit, to the UE, an indication of one or more quantized resource allocation parameters associated with the GI-based waveform, and communicate the GI-based waveform with the UE using the one or more quantized resource allocation parameters and the set of GI-based waveform parameters.

Another network entity for wireless communications is described. The network entity may include means for transmitting, to a UE, one or more first signals that indicate a resource allocation and that indicate a set of GI-based waveform parameters for a GI-based waveform associated with the UE, means for transmitting, to the UE, an indication of one or more quantized resource allocation parameters associated with the GI-based waveform, and means for communicating the GI-based waveform with the UE using the one or more quantized resource allocation parameters and the set of GI-based waveform parameters.

A non-transitory computer-readable medium storing code for wireless communications is described. The code may include instructions executable by a processor to transmit, to a UE, one or more first signals that indicate a resource allocation and that indicate a set of GI-based waveform parameters for a GI-based waveform associated with the UE, transmit, to the UE, an indication of one or more quantized resource allocation parameters associated with the GI-based waveform, and communicate the GI-based waveform with the UE using the one or more quantized resource allocation parameters and the set of GI-based waveform parameters.

In some examples of the method, network entities, and non-transitory computer-readable medium described herein, the indication includes a configuration that indicates one or more formulas for determination of the one or more quantized resource allocation parameters.

In some examples of the method, network entities, and non-transitory computer-readable medium described herein, transmitting the indication may include operations, features, means, or instructions for transmitting a message including the one or more quantized resource allocation parameters associated with the GI-based waveform.

Some examples of the method, network entities, and non-transitory computer-readable medium described herein may further include operations, features, means, or instructions for transmitting, to the UE, an indication of one or more second quantized resource allocation parameters associated with the GI-based waveform, where the one or more second quantized resource parameters may be different than the one or more resource allocation parameters.

Some examples of the method, network entities, and non-transitory computer-readable medium described herein may further include operations, features, means, or instructions for receiving, from the UE, one or more messages requesting one or more third quantized resource allocation parameters, where the indication of the one or more second quantized resource allocation parameters may be received in response to the one or more messages.

Some examples of the method, network entities, and non-transitory computer-readable medium described herein may further include operations, features, means, or instructions for receiving, from the UE, one or more messages indicating an incompatibility for the one or more quantized resource allocation parameters, where the indication of the one or more second quantized resource allocation parameters may be received in response to the one or more messages.

In some examples of the method, network entities, and non-transitory computer-readable medium described herein, the one or more quantized resource allocation parameters include one or more GI length parameters, one or more SS length parameters, or a combination thereof, where the one or more quantized resource allocation parameters may be quantized according to a quantization grid.

Some examples of the method, network entities, and non-transitory computer-readable medium described herein may further include operations, features, means, or instructions for transmitting one or more signals that indicate a head GI length in a time domain, a tail GI length in the time domain, or both.

Some examples of the method, network entities, and non-transitory computer-readable medium described herein may further include operations, features, means, or instructions for transmitting one or more signals indicating a head SS length in a time domain or a pre-transform domain, a tail SS length in a time domain or a pre-transform domain, or both.

Some examples of the method, network entities, and non-transitory computer-readable medium described herein may further include operations, features, means, or instructions for determining an allocation of one or more resource blocks or one or more tones based on a quantization of the one or more GI length parameters, of the one or more SS length parameters, or of both.

Some examples of the method, network entities, and non-transitory computer-readable medium described herein may further include operations, features, means, or instructions for determining a data allocation of one or more resource blocks or one or more tones based on a difference between the allocation and the quantized one or more GI length parameters, the quantized one or more SS length parameters, or both.

In some examples of the method, network entities, and non-transitory computer-readable medium described herein, the quantization of the one or more GI length parameters, of the one or more SS length parameters, or of both may be based on a rounding based quantization, a deviation based quantization, or a combination thereof.

In some examples of the method, network entities, and non-transitory computer-readable medium described herein, the quantization of the one or more GI length parameters, of the one or more SS length parameters, or of both may be based on a modulation and coding scheme, a symbol type, a delay spread, an allocated bandwidth, an error target, a throughput target or a combination thereof.

Some examples of the method, network entities, and non-transitory computer-readable medium described herein may further include operations, features, means, or instructions for determining a GI length of the one or more GI length parameters and a SS length of the one or more SS length parameters based on a total quantized GI length and the SS length.

In some examples of the method, network entities, and non-transitory computer-readable medium described herein, a quantization of the GI length and the SS length may be to a first grid, a second grid, or both, where the first grid may be a resource block grid and the second grid may be an integer grid.

DETAILED DESCRIPTION

In some examples, one or more wireless devices may communicate using a guard interval (GI)-based waveform. Additionally, or alternatively, the one or more wireless devices may communicate using a cyclic prefix (CP)-based waveform. For example, GIs may be appended within a fast Fourier transform (FFT) window such that one or more symbol boundaries may not be based on variable GI lengths. In some other examples, CPs may be prepended to a FFT window such that the one or more symbol boundaries may be based on the variable CP length. In such examples, GI-based waveforms may be associated with more adaptability for a delay spread of a UE relative to a CP-based waveform without changing the symbol boundaries, an ability to have a phase or frequency tracking reference signal within the GI, a cross link interference reference signal (CLI-RS) implementation within the GI, an ability to switch beams within the GI, or the like.

A GI-based waveform symbol may include a head GI, a tail GI, and one or more suppression signals (SSs) at the start or end of a symbol to reduce interference (e.g., inter-symbol-interference (ISI) or inter-carrier-interference (ICI)). A network entity may allocate resources for the GI symbol for data, the tail GI, the head GI, a head SS, or a tail SS. In some cases, when discrete Fourier transform (DFT) or inverse FFT (IFFT) operations are performed on signaling allocating resources for GI symbols, the allocations may be unaligned with a resource block grid or fractional. Thus, the resources may be quantized such that the head GI, tail GI, one or more SSs, and data may be aligned with a resource block grid. The quantization may ensure simplicity of implementation and reduce signaling overhead associated with the GI-based waveform.

As described herein, a wireless device may receive a bandwidth allocation and an indication of a configuration for resource quantization associated with the GI-based waveform. The configuration may indicate one or more quantized parameters, a formulation for determining the one or more quantized parameters, or both. For example, a UE may receive an indication of an algorithm (e.g., one or more formulae) for calculating quantized parameters from a network entity, calculate the quantized parameters, and communicate using the quantized parameters. Additionally, or alternatively, the network entity may calculate the one or more quantized parameters and indicate the one or more quantized parameters to the UE.

Aspects of the disclosure are initially described in the context of wireless communications systems. Aspects of the disclosure are also described in the context of resource block diagrams and process flows. Aspects of the disclosure are further illustrated by and described with reference to apparatus diagrams, system diagrams, and flowcharts that relate to resource quantization for GI-based waveforms.

Figure 1:
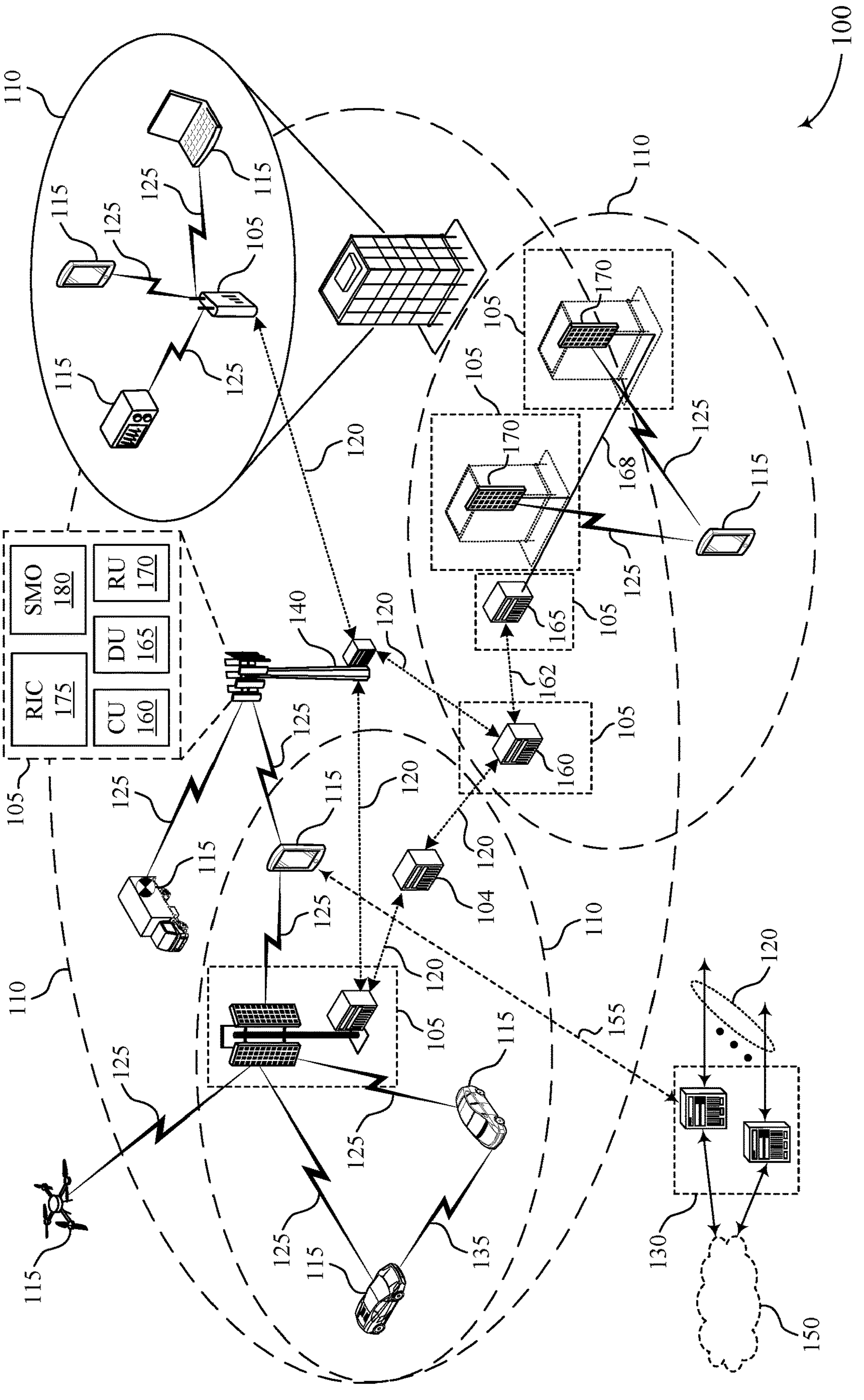
FIGS. 1 and 2 show examples of wireless communications systems that support resource quantization for guard interval (GI)-based waveforms in accordance with one or more aspects of the present disclosure.

FIG. 1 shows an example of a wireless communications system 100 that supports resource quantization for GI-based waveforms in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support resource quantization for GI-based waveforms as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115).

In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

As described herein, the UE 115 may receive, from the network entity 105, one or more first signals that indicate a resource allocation and that indicate a set of GI-based waveform parameters for a GI-based waveform associated with the UE 115. The UE 115 may receive, from the network entity 105, an indication of one or more quantized resource allocation parameters associated with the GI-based waveform. The indication may include one or more formulas for determination of the one or more quantized resource allocation parameters, the one or more quantized resource allocation parameters, or both. The UE 115 may communicate the GI-based waveform with the network entity 105 using the one or more quantized resource allocation parameters and the set of GI-based waveform parameters.

Figure 2:
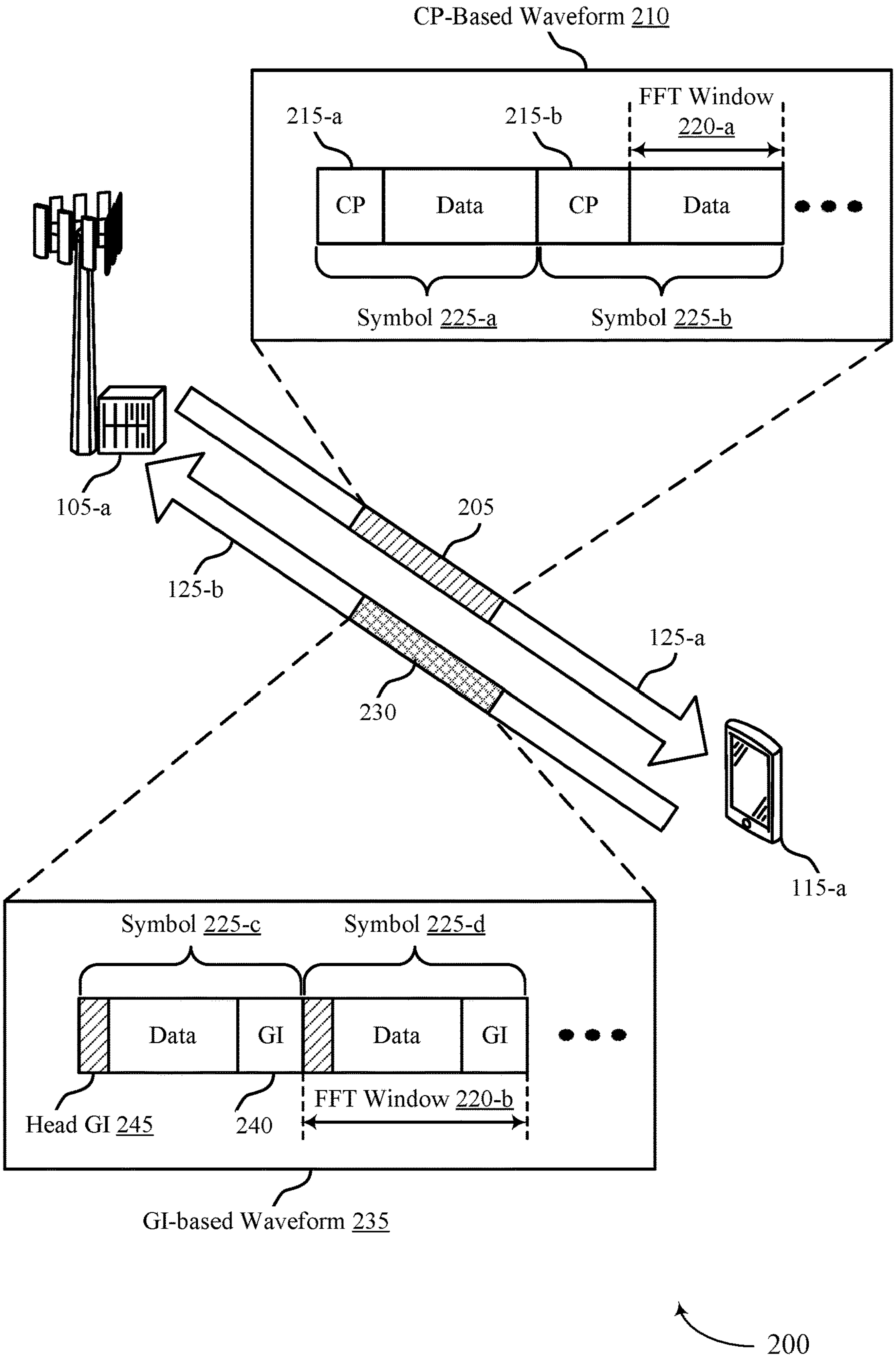

FIG. 2 shows an example of a wireless communications system 200 that supports resource quantization for GI-based waveforms in accordance with one or more aspects of the present disclosure. The wireless communications system 200 may implement or be implemented by various aspects of the wireless communications system 100. For example, the wireless communications system 200 may include a network entity 105-*a*, a UE 115-*a*, a communication link 125-*a*, and a communication link 125-*b*, which may represent examples of corresponding devices as described with reference to FIG. 1.

In some cases, the network entity 105-*a*, the UE 115-*a*, or both may communicate via a GI-based or CP-based waveform. By way of example, the network entity 105-*a* may transmit a message 205 to the UE 115-*a* via the communication link 125-*a* using a CP-based waveform 210. The CP-based waveform 210 may include one or more symbols, such as a symbol 225-*a* and a symbol 225-*b*, which each may include a CP and data. For example, the symbol 225-*a* may include a CP 215-*a* and first data while the symbol 225-*b* may include a CP 215-*b* and second data. That is, the network entity 105-*a* may prepend a CP to the symbol 225-*a*, the symbol 225-*b*, or both, which may each be examples of a CP-OFDM symbol.

Additionally, or alternatively, a length of the CP 215-*a*, a length of the CP 215-*b*, or both may be based on the first data or the second data, respectively. For example, the network entity 105-*a* may generate the CP 215-*a*, the CP 215-*b*, or both based on a time-domain OFDM waveform. The CP 215-*a*, the CP 215-*b*, or both may be a repetition of the end of the corresponding symbol. That is, the CP 215-*a* may be a repetition (e.g., copy) of the end of the symbol 225-*a*, and the CP 215-*b* may be a repetition of the end of the symbol 225-*b*.

An FFT window 220-*a* may correspond to the first data, the second data, or both. The FFT window 220-*a* may not include the CP 215-*a*, the CP 215-*b*, or both based on the CP 215-*a*, the CP 215-*b*, or both being prepended to the FFT window 220-*a* to form the symbol 225-*a* and the symbol 225-*b*, respectively (e.g., rather than being within the FFT window 220-*a*).

Additionally, or alternatively, the UE 115-*a* may transmit a message 230 to the network entity 105-*a* via the communication link 125-*b* using a GI-based waveform 235. The GI-based waveform may include one or more symbols, such as a symbol 225-*c* and a symbol 225-*b*, each of which may include a head GI (e.g., optionally include), data, and a GI. For example, the symbol 225-*c* may include the head GI 245, first data, and a GI 240. The GI 240 may also be called the tail GI. That is, the network may add the head GI 245 and the GI 240 within the symbol 225-*c* (e.g., rather than prepending or appending a sequence to the symbol). The GI symbol 225-*c* may be shorter than the CP symbol 225-*a*. In some cases, a slot of the GI-based waveform 235 may include relatively more symbols than the CP-based waveform 210 based on the GI 240 being included within symbols rather than prepended or appended to symbols.

In some examples, an FFT window 220-*b* may correspond to the head GI 245, data, and GI 240. For example, the FFT window 220-*b* may include the head GI 245 and the GI 240 based on the head GI 245, the GI 240, or both being added within the symbol 225-*c*.

In some cases, the GI 240 (e.g., in a time domain) may include leakage from the first data. For example, the GI 240 may include leakage due to DFT-IFFT up-sampling at a transmitter. In some examples, the leakage may be associated with non-circular convolution. Additionally, or alternatively, the non-circular convolution may be associated with ISI, ICI, or both. The head GI 245 may remove a highest energy portion of the leakage from the GI 240. In some cases, the symbol 225-*c*, the symbol 225-*d*, or both may include one or more SSs (e.g., in addition to the head GI 245) to suppress the leakage. For example, the suppression signal may be one or more additional samples to suppress leakage into the head GI 245 and the GI 240.

Additionally, or alternatively, a length of the GI 240 may be based on a fixed (e.g., known) sequence. In some examples, the GI-based waveform 235 may be associated with greater flexibility in high frequency ranges, greater adaptability for variable delay spread, phase or frequency tracking reference signals, CLI estimation, and beam switching capabilities as opposed to the CP-based waveform 210.

In some cases, the GI-based waveform 235 may be generated with different transmitter architectures. Examples may include a GI-OFDM or unique word (UW)-OFDM waveform, a GI-DFT spread OFDM waveform, a GI-single carrier waveform, or the like.

Figure 3A:
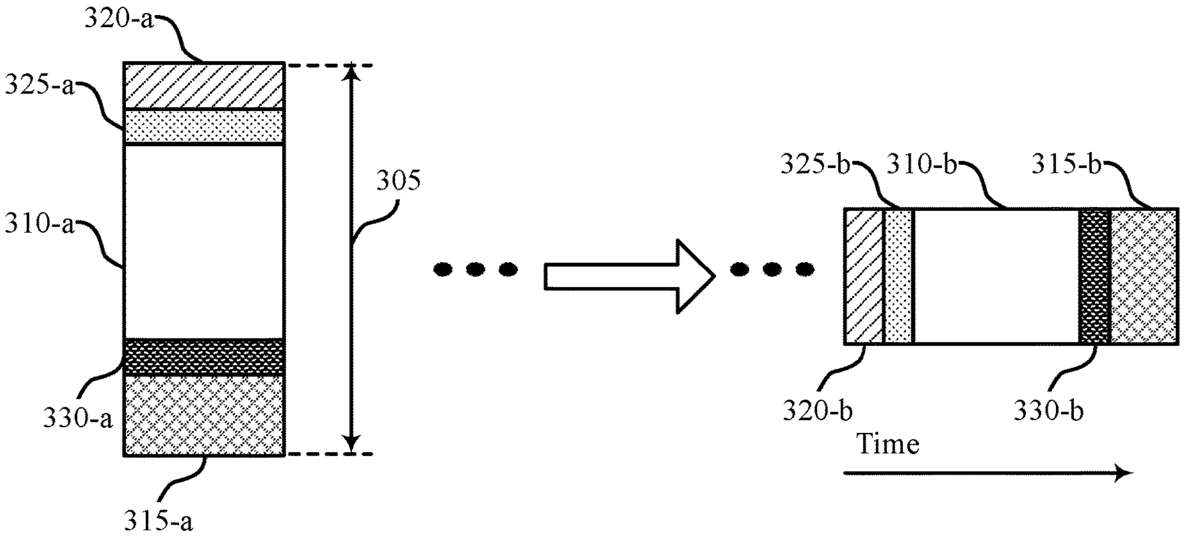
FIGS. 3A and 3B show examples of resource block diagrams that support resource quantization for GI-based waveforms in accordance with one or more aspects of the present disclosure.
Figure 3B:
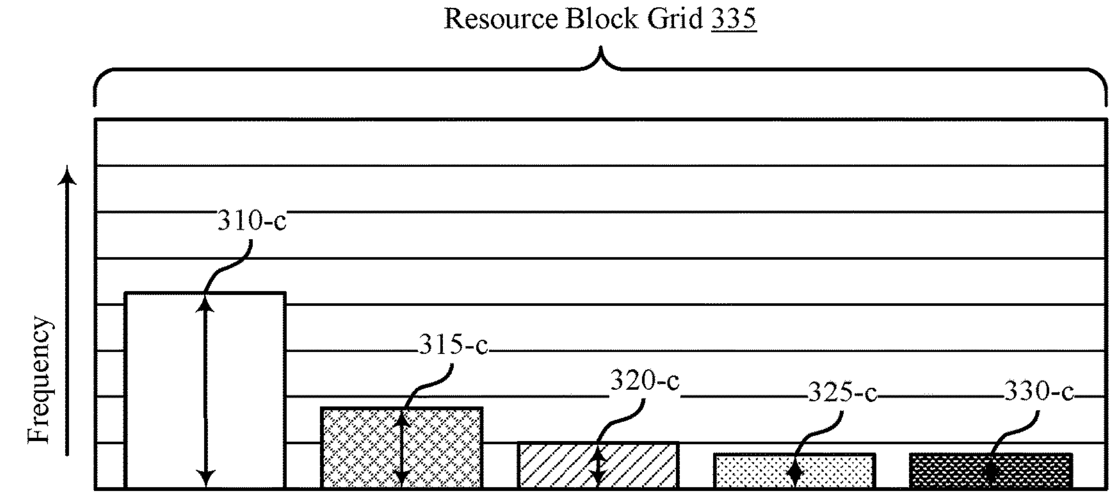

FIGS. 3A and 3B show examples of a resource block diagrams 300-*a* and 300-*b* that support resource quantization for GI-based waveforms in accordance with one or more aspects of the present disclosure. The resource block diagrams 300-*a* and 300-*b* may implement or be implemented by various aspects of the wireless communications system 100. For example, the resource block diagrams 300-*a* and 300-*b* may be implemented by a network entity, a UE, or both, which may represent examples of corresponding devices as described with reference to FIGS. 1 and 2.

As illustrated by the example of FIG. 3A, a wireless device (e.g., a network entity, a UE, etc.) may transform a GI symbol having a length 305 from a pre-DFT domain to a time domain. For example, the GI symbol may include data tones 310-*a*, tail GI 315-*a*, head GI 320-*a*, head SS 325-*a*, and tail SS 330-*a*. The data tones 310-*a*, the tail GI 315-*a*, the head GI 320-*a*, the head SS 325-*a*, and the tail SS 330-*a* may correspond to lengths in a pre-DFT domain (e.g., frequency domain). The GI symbol may undergo a DFT, an IFFT, or both. For example, the wireless device may transform the GI symbol by a factor M associated with the DFT size, a factor N associated with the IFFT size, or both.

In some examples, the pre-DFT GI allocations may correspond to one or more lengths of the GI symbol in the time domain. For example, the wireless device may determine, based on the allocations for the data tones 310-*a*, the tail GI 315-*a*, the head GI 320-*a*, the head SS 325-*a*, and the tail SS 330-*b* in the pre-DFT domain, the lengths of a data symbol 310-*b*, a tail GI 315-*b*, a head GI 320-*b*, a head SS 325-*b*, and a tail SS 330-*b*, respectively, in the time domain. For example, the allocations in the pre-DFT domain may correspond to the lengths in the time domain according to the factors M and N associated with the DFT and IFFT sizes, respectively.

As illustrated in the example of FIG. 3B, GI allocations (e.g., pre-DFT, time domain, or both) may be unaligned with a resource block grid 335. For example, the allocations for a data tone 310-*c*, a tail GI 315-*c*, a head GI 320-*c*, a head SS 325-*c*, and a tail SS 330-*c* may be unaligned with the resource block grid 335, may be fractional, or both. For example, the allocations may be unaligned with the resource block grid 335, fractional, or both based on the factors M and N associated with the DFT and IFFT sizes, respectively.

In some cases, a wireless device (e.g., a UE) may receive (e.g., from a network entity) one or more parameters (e.g., data tones, tail GI, head GI, head SS, tail SS, etc.) in a time domain, in a frequency domain, or both. Additionally, or alternatively, the wireless device (e.g., a network entity) may determine the one or more parameters to transmit to a receiving device (e.g., a UE). The wireless device may calculate resource block-quantized parameters based on an algorithm for quantization.

For example, the wireless device may receive an indication of M total allocated tones, a time-domain tail GI length $N_{GI-tail}$, a time-domain head GI length, $N_{GI-head}$, a pre-DFT domain tail SS length $M_{SS-tail}$, and a pre-DFT head SS length $M_{SS-head}$.

The wireless device may determine a pre-DFT tail GI length, $M_{GI-tail}$, based on Equation 1 below.

$$M_{GI-tail} = \frac{M}{N} * N_{GI-tail} \quad (1)$$

Additionally, or alternatively, the wireless device may determine a pre-DFT head GI length, $M_{GI-head}$, based on Equation 2 below.

$$M_{GI-head} = \frac{M}{N} * N_{GI-tail} \quad (2)$$

The wireless device may determine a total GI-related parameter length, $M_{GI+SS}$ (e.g., the length of all allocations apart from data allocations in this example), based on Equation 3 below.

$$M_{GI+SS} = M_{GI-tail} + M_{GI-head} + M_{SS-tail} + M_{SS-head} \quad (3)$$

Additionally, or alternatively, the wireless device may quantize the total GI-related allocation, $M_{GI+SS}$. For example, the wireless device may quantize $M_{GI+SS}$ to a multiple of tones (e.g., 12 tones) such that the allocations are aligned with the resource block grid 335.

The wireless device may round $M_{GI+SS}$ up or down to a nearest integer quantity of resource blocks (e.g., a multiple of 12 tones). For example, the wireless device may round up according to Equation 4 below.

$$M_{GI+SS}^{Q,up} = \text{ceil}\left(\frac{M_{GI+SS}}{12}\right) * 12 \quad (4)$$

Additionally, or alternatively, the wireless device may round down according to Equation 5 below.

$$M_{GI+SS}^{Q,down} = \text{floor}\left(\frac{M_{GI+SS}}{12}\right) * 12 \quad (5)$$

The wireless device, by rounding $M_{GI+SS}$ up or down to a nearest integer quantity of resource blocks, may introduce deviation in $M_{GI+SS}$, $N_{GI+SS}$, or both. For example, $$M_{GI+SS}^{Q,up},\ M_{GI+SS}^{Q,down},\ N_{GI+SS}^{Q,up},\ \text{or}\ N_{GI+SS}^{Q,down}$$

may deviate from $M_{GI+SS}$ or $N_{GI+SS}$ (e.g., by up to 11 tones).

The wireless device may minimize an absolute deviation (e.g., positive or negative) by selecting a quantization rounding option (e.g., Equation 4 or Equation 5) based on a bandwidth, FFT size, tail GI or head GI length, or tail SS or head SS length. For example, the wireless device may determine a first absolute deviation associated with rounding up and determine a second absolute deviation associated with rounding down. The wireless device may select a lowest absolute deviation based on comparing the first absolute deviation and the second absolute deviation. For example, the wireless device may select $$M_{GI+SS}^{Q,up}\ \text{or}\ M_{GI+SS}^{Q,down}$$

to be $$M_{GI+SS}^{Q}.$$

The wireless device may, based on computing the quantized total GI-related allocation, determine a quantized data allocation. For example, the wireless device may determine a quantized data allocation according to equation 6 below.

$$M_{data}^{Q} = M - M_{GI+SS}^{Q} \quad (6)$$

In some examples, the wireless device may further determine an integer-grid split between the $$M_{GI-tail}^{Q},\ M_{GI-head}^{Q},\ M_{SS-tail}^{Q},\ \text{and}\ M_{SS-head}^{Q}$$

from $$M_{GI+SS}^{Q}.$$

For example, the wireless device may divide the quantized total allocation for GI-related parameters, $$M_{GI+SS}^{Q},$$

into quantized allocations for each individual parameter.

For example, the wireless device (e.g., a network entity) may determine a split between an allocation for GI (e.g., tail GI, head GI, or both) and an allocation for SS (e.g., tail SS, head SS, or both). In some examples, the wireless device may fix the allocation for GI or the allocation for SS and derive the non-fixed parameter via subtraction. Additionally, or alternatively, the wireless device may determine the respective allocations via a percentage, a minimum, a ceiling function, a floor function, or a combination thereof.

The wireless device may determine a split between head and tail allocations for GI, SS, or both based on fixing a head or tail allocation and deriving the non-fixed parameter via subtraction. Or, the wireless device may determine the split between head and tail allocations via a percentage, a minimum, a ceiling function, a floor function, or a combination thereof.

The wireless device may calculate resource block-quantized parameters based on the algorithm for quantization (e.g., Equations 1 through 6). Additionally, or alternatively, the wireless device may determine the resource block-quantized parameters based on one or more parameters associated with performance. For example, the wireless device may determine the resource block-quantized parameters based on an modulation coding scheme (MCS) value, a type of symbol (e.g., PUSCH, PDSCH, PUCCH, PDCCH, DMRS, etc.), a delay spread, or the like. That is, the wireless device may determine the resource block-quantized parameters based on optimizing end-to-end performance. Since the GI length parameters such as the head GI length, the tail GI length, the head SS length, and the tail SS length affect the receiver performance in a wireless channel, by choosing them to optimize end-to-end-performance, the wireless device may improve the communication operation.

In some examples, the wireless device may refrain from determining one or more of the resource block-quantized parameters. For example, the wireless device (e.g., a network entity) may signal, to a receiving device (e.g., a UE), an indication of a first subset of the resource block-quantized parameters, where a second subset of the resource block-quantized parameters are undetermined by the wireless device. That is, the receiving device may determine the second subset of the resource block-quantized parameters. In some cases, the receiving device may determine the second subset of the resource block-quantized parameters based on a capability of the receiving device.

Figure 4:
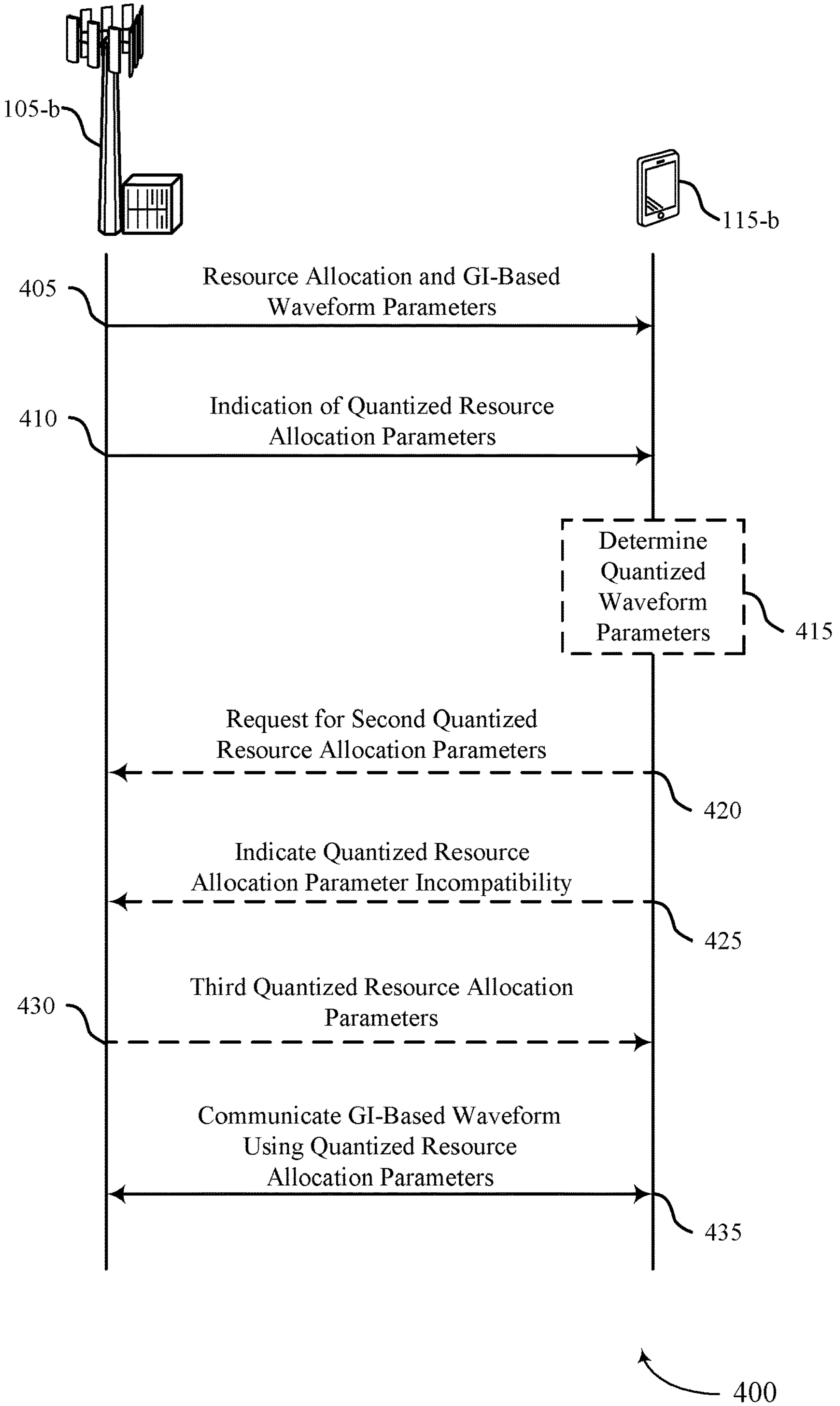
FIGS. 4 and 5 show examples of process flows that support resource quantization for GI-based waveforms in accordance with one or more aspects of the present disclosure.

FIG. 4 shows an example of a process flow 400 that supports resource quantization for GI-based waveforms in accordance with one or more aspects of the present disclosure. In some examples, the process flow 400 may implement or be implemented by aspects of the wireless communications system 100, the wireless communications system 200, and the resource block diagrams 300-*a* and 300-*b* as described with reference to FIGS. 1-3. For example, the process flow 400 may include a network entity 105-*b* and a UE 115-*b*, which may be examples of corresponding devices as described with reference to FIGS. 1-3.

Alternative examples of the following may be implemented, where some steps are performed in a different order than described or are not performed at all. In some cases, steps may include additional features not mentioned below, or further steps may be added. Although the network entity 105-*b* and the UE 115-*b* are shown performing the operations of the process flow 400, some aspects of some operations may also be performed by one or more other wireless devices.

At 405, the network entity 105-*b* may transmit a resource allocation and GI-based waveform parameters to the UE 115-*b*. For example, the network entity 105-*b* may transmit one or more first signals that indicate the resource allocation and that indicate a set of GI-based waveform parameters for a GI-based waveform associated with the network entity 105-*b*, the UE 115-*b*, or both. The resource allocation and GI-based waveform parameters may be an example of a GI resource quantization configuration. In some examples, the GI resource quantization configuration may include a set of quantization formulae for quantizing resource allocations for GI-based waveforms (e.g., for head GI, tail GI, head SS, tail SS, and other active tones). The resource allocation may include one or more frequency domain resource allocation parameters including a bandwidth allocation according to a quantity of resource blocks (e.g., integer resource blocks, M tones, etc.).

At 410, the network entity 105-*b* may transmit an indication of one or more quantized resource allocation parameters to the UE 115-*b*. For example, the quantized resource allocation parameters may be associated with the GI-based waveform.

In some examples, the indication may include a configuration that indicates one or more formulas for determination of the one or more quantized resource allocation parameters.

At 415, the UE 115-*b* may determine the one or more quantized waveform parameters. For example, the UE 115-*b* may compute the quantized waveform parameters according to the set of quantization formulae for quantizing resource allocations received at 405.

In some examples, the UE 115-*b* may determine an allocation of one or more resource blocks or one or more tones based on a quantization of the one or more GI length parameters, of the one or more SS length parameters, or both.

Additionally, or alternatively, the UE 115-*b* may determine a data allocation of one or more resource blocks or one or more tones based on a difference between the allocation and the quantized one or more GI length parameters, the quantized one or more SS length parameters, or both.

In some examples, the UE 115-*b* may determine the quantized waveform parameters at 415 based on a rounding based quantization, a deviation based quantization, or both. For example, the UE 115-*b* may quantize the one or more GI length parameters, the one or more SS length parameters, or both according to the rounding based quantization, the deviation based quantization, or both.

Additionally, or alternatively, the UE 115-*b* may determine the quantized waveform parameters at 415 based on an MCS, a symbol type, a delay spread, an allocated bandwidth, an error target, a throughput target, or the like. For example, the UE 115-*b* may quantize the one or more GI length parameters, the one or more SS length parameters, or both according to the MCS, the symbol type, the delay spread, the allocated bandwidth, the error target, the throughput target, or the like.

In some examples, the UE 115-*b* may determine a GI length of the one or more GI length parameters and an SS length of the one or more SS length parameters based on a total quantized GI length and the SS length. For example, a quantization of the GI length and the SS length may be to a first grid, a second grid, or both. The first grid may be a resource block grid while the second grid may be an integer grid.

At 420, the UE 115-*b* may transmit a request for second quantized resource allocation parameters to the network entity 105-*b*. For example, the UE 115-*b* may request a parameter adjustment. The UE 115-*b*, based on receiving the resource allocation and GI-based waveform parameters (e.g., GI resource configuration) at 405, may request one or more GI-related parameters from the network entity 105-*b* (e.g., according to a capability of the UE 115-*b*). In some examples, the UE 115-*b* may indicate the one or more GI-related quantized parameters to the network entity 105-*b* based on determining the quantized waveform parameters at 415.

At 425, the UE 115-*b* may indicate a quantized resource allocation parameter incompatibility to the network entity 105-*b*. For example, the UE 115-*b* may transmit one or more messages indicating an incompatibility for the one or more quantized resource allocation parameters. The UE 115-*b* may identify a parameter incompatibility based on a capability of the UE 115-*b*. In some examples, the UE 115-*b* may indicate the parameter incompatibility based on receiving the GI resource quantization configuration 405, computing the quantized waveform parameters at 415, or both. Or, the UE 115-*b* may indicate the parameter incompatibility based on receiving GI-related quantized parameters.

At 430, the network entity 105-*b* may transmit third quantized resource allocation parameters to the UE 115-*b*. For example, the network entity 105-*b* may transmit an indication of one or more third resource allocation parameters associated with the GI-based waveform, where the one or more third quantized resource allocation parameters are different from the one or more quantized resource allocation parameters, the one or more second quantized resource allocation parameters, or both. In some examples, the network entity 105-*b* may transmit the third quantized resource allocation parameters based on receiving the request for the one or more second quantized resource allocation parameters at 420, based on receiving the indication of incompatibility at 425, or both.

For example, the network entity 105-*b* may determine an adjusted parameter based on receiving the request for a parameter adjustment at 420, receiving the indication of a parameter incompatibility at 425, or both. In some examples, the adjusted parameter and the requested parameter adjustment may be the same or different.

At 435, the network entity 105-*b* and the UE 115-*b* may communicate the GI-based waveform using quantized resource allocation parameters. For example, the network entity 105-*b*, the UE 115-*b*, or both may communicate the GI-based waveform using the one or more quantized resource allocation parameters and the set of GI-based waveform parameters. In some examples, the network entity 105-*b*, the UE 115-*b*, or both may communicate the GI-based waveform using the one or more second quantized resource allocation parameters or the one or more third quantized resource allocation parameters.

In some cases, the network entity 105-*b*, the UE 115-*b*, or both may communicate using the one or more quantized resource allocation parameters determined by the UE 115-*b*.

Figure 5:
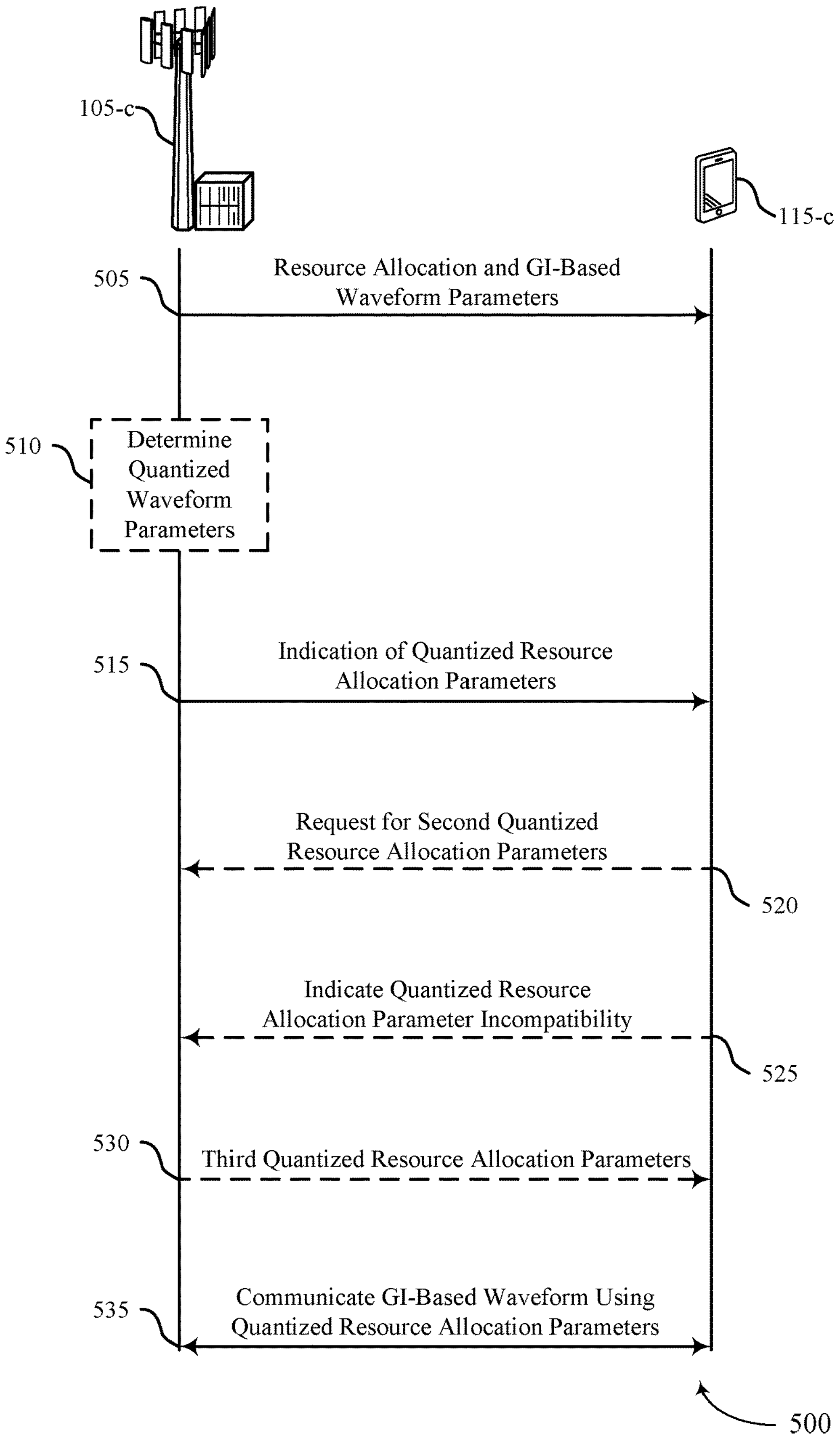

FIG. 5 shows an example of a process flow 500 that supports resource quantization for GI-based waveforms in accordance with one or more aspects of the present disclosure. In some examples, the process flow 500 may implement or be implemented by aspects of the wireless communications system 100, the wireless communications system 200, and the resource block diagrams 300-*a* and 300-*b* as described with reference to FIGS. 1-3. For example, the process flow 500 may include a network entity 105-*c* and a UE 115-*c*, which may be examples of corresponding devices as described with reference to FIGS. 1-3.

Alternative examples of the following may be implemented, where some steps are performed in a different order than described or are not performed at all. In some cases, steps may include additional features not mentioned below, or further steps may be added. Although the network entity 105-*c* and the UE 115-*c* are shown performing the operations of the process flow 500, some aspects of some operations may also be performed by one or more other wireless devices.

At 505, the network entity 105-*c* may transmit a resource allocation and GI-based waveform parameters to the UE 115-*c*. For example, the network entity 105-*c* may transmit one or more first signals that indicate the resource allocation and that indicate a set of GI-based waveform parameters for a GI-based waveform associated with the network entity 105-*c*, the UE 115-*c*, or both. The resource allocation and GI-based waveform parameters may be an example of a GI resource quantization configuration. In some examples, the GI resource quantization configuration may include a set of quantization formulae for quantizing resource allocations for GI-based waveforms (e.g., for head GI, tail GI, head SS, tail SS, and other active tones). The resource allocation may include one or more frequency domain resource allocation parameters including a bandwidth allocation according to a quantity of resource blocks (e.g., integer resource blocks, M tones, etc.).

At 510, the network entity 105-*c* may determine the one or more quantized waveform parameters. For example, the network entity 105-*c* may determine (e.g., compute) the one or more quantized resource allocation parameters based on the one or more formulas for determination of the one or more quantized resource allocation parameters.

In some examples, the network entity 105-*c* may determine an allocation of one or more resource blocks or one or more tones based on a quantization of the one or more GI length parameters, of the one or more SS length parameters, or both.

Additionally, or alternatively, the network entity 105-*c* may determine a data allocation of one or more resource blocks or one or more tones based on a difference between the allocation and the quantized one or more GI length parameters, the quantized one or more SS length parameters, or both.

In some examples, the network entity 105-*c* may determine the quantized waveform parameters at 510 based on a rounding based quantization, a deviation based quantization, or both. For example, the network entity 105-*c* may quantize the one or more GI length parameters, the one or more SS length parameters, or both according to the rounding based quantization, the deviation based quantization, or both.

Additionally, or alternatively, the network entity 105-*c* may determine the quantized waveform parameters at 510 based on an MCS, a symbol type, a delay spread, an allocated bandwidth, an error target, a throughput target, or the like. For example, the network entity 105-*c* may quantize the one or more GI length parameters, the one or more SS length parameters, or both according to the MCS, the symbol type, the delay spread, the allocated bandwidth, the error target, the throughput target, or the like.

In some examples, the network entity 105-*c* may determine a GI length of the one or more GI length parameters and an SS length of the one or more SS length parameters based on a total quantized GI length and the SS length. For example, a quantization of the GI length and the SS length may be to a first grid, a second grid, or both. The first grid may be a resource block grid while the second grid may be an integer grid.

At 515, the network entity 105-*c* may transmit an indication of one or more quantized resource allocation parameters to the UE 115-*c*. For example, the quantized resource allocation parameters (e.g., GI-related parameters) may be associated with the GI-based waveform.

In some examples, the indication may include a configuration that indicates one or more formulas for determination of the one or more quantized resource allocation parameters.

In some examples, the one or more quantized resource allocation parameters may include one or more GI length parameters, one or more SS length parameters, or both. The one or more quantized resource allocation parameters may be quantized according to a quantization grid. For example, the network entity 105-*c* may transmit the one or more quantized resource allocation parameters to the UE 115-*c* via the indication of the one or more quantized resource allocation parameters at 515. Additionally, or alternatively, the network entity 105-*c* may transmit (i.e., separate from transmitting the indication at 510) a message including the one or more quantized resource allocation parameters associated with the GI-based waveform.

The network entity 105-*c* may transmit one or more signals that indicate a head GI length in a time domain, a tail GI length in the time domain, or both. For example, the network entity 105-*c* may transmit the one or more signals in addition to the indication of the one or more quantized resource allocation parameters. Or, the network entity 105-*c* may indicate the head GI length, the tail GI length, or both via the indication of the one or more quantized resource allocation parameters.

The network entity 105-*c* may transmit one or more signals that indicate a head SS length in a time domain or a pre-transform domain, a tail SS length in the time domain or pre-transform domain, or both. For example, the network entity 105-*c* may transmit the one or more signals in addition to the indication of the one or more quantized resource allocation parameters. Or, the network entity 105-*c* may indicate the head SS length, the tail SS length, or both via the indication of the one or more quantized resource allocation parameters.

The network entity 105-*c* may indicate the one or more quantized resource allocation parameters (e.g., GI-related parameters) in terms of a reference time. For example, the network entity 105-*c* may indicate a tail GI, a head GI, or both according to the reference time $$\left(\text{e.g., } T_C = \frac{1}{2048 \times 480 \text{ kHz}}\right).$$

Additionally, or alternatively, the head GI, tail GI, head SS, tail SS, or a combination thereof may depend on a subcarrier spacing (SCS).

In some examples, the network entity 105-*c* may indicate the one or more quantized resource allocation parameters (e.g., GI-related parameters) in a time domain or a pre-DFT domain. For example, the network entity 105-*c* may indicate the head SS, the tail SS, or both in the time domain or pre-DFT domain.

At 520, the UE 115-*c* may transmit a request for second quantized resource allocation parameters to the network entity 105-*c*. For example, the UE 115-*c* may transmit one or more messages requesting one or more second quantized resource allocation parameters. For example, the UE 115-*c* may request a parameter adjustment. The UE 115-*c*, based on receiving the resource allocation and GI-based waveform parameters (e.g., GI resource configuration) at 505, may request one or more GI-related parameters from the network entity 105-*c* (e.g., according to a capability of the UE 115-*c*). In some examples, the UE 115-*c* may indicate the one or more GI-related quantized parameters to the network entity 105-*c* based on determining the quantized waveform parameters (e.g., based on a set of formulae).

At 525, the UE 115-*c* may indicate a quantized resource allocation parameter incompatibility to the network entity 105-*c*. For example, the UE 115-*c* may transmit one or more messages indicating an incompatibility for the one or more quantized resource allocation parameters. The UE 115-*c* may identify a parameter incompatibility based on a capability of the UE 115-*c*. In some examples, the UE 115-*c* may indicate the parameter incompatibility based on receiving the resource allocation and GI-based waveform parameters at 505, determining the quantized waveform parameters, or both. Or, the UE 115-*c* may indicate the parameter incompatibility based on receiving the indication of quantized resource allocation parameters at 410.

At 530, the network entity 105-*c* may transmit third quantized resource allocation parameters to the UE 115-*c*. For example, the network entity 105-*c* may transmit an indication of one or more third resource allocation parameters associated with the GI-based waveform, where the one or more third quantized resource allocation parameters are different from the one or more quantized resource allocation parameters, the one or more second quantized resource allocation parameters, or both. In some examples, the network entity 105-*c* may transmit the third quantized resource allocation parameters based on receiving the request for the one or more second quantized resource allocation parameters at 520, based on receiving the indication of incompatibility at 525, or both.

For example, the network entity 105-*c* may determine an adjusted parameter based on receiving the request for a parameter adjustment at 520, receiving the indication of a parameter incompatibility at 525, or both. In some examples, the adjusted parameter and the requested parameter adjustment may be the same or different.

At 535, the network entity 105-*c* and the UE 115-*c* may communicate the GI-based waveform using quantized resource allocation parameters. For example, the network entity 105-*c*, the UE 115-*c*, or both may communicate the GI-based waveform using the one or more quantized resource allocation parameters and the set of GI-based waveform parameters. In some examples, the network entity 105-*c*, the UE 115-*c*, or both may communicate the GI-based waveform using the one or more second quantized resource allocation parameters or the one or more third quantized resource allocation parameters.

In some cases, the network entity 105-*c*, the UE 115-*c*, or both may communicate using the one or more quantized resource allocation parameters determined by the network entity 105-*c*.

Figure 6:
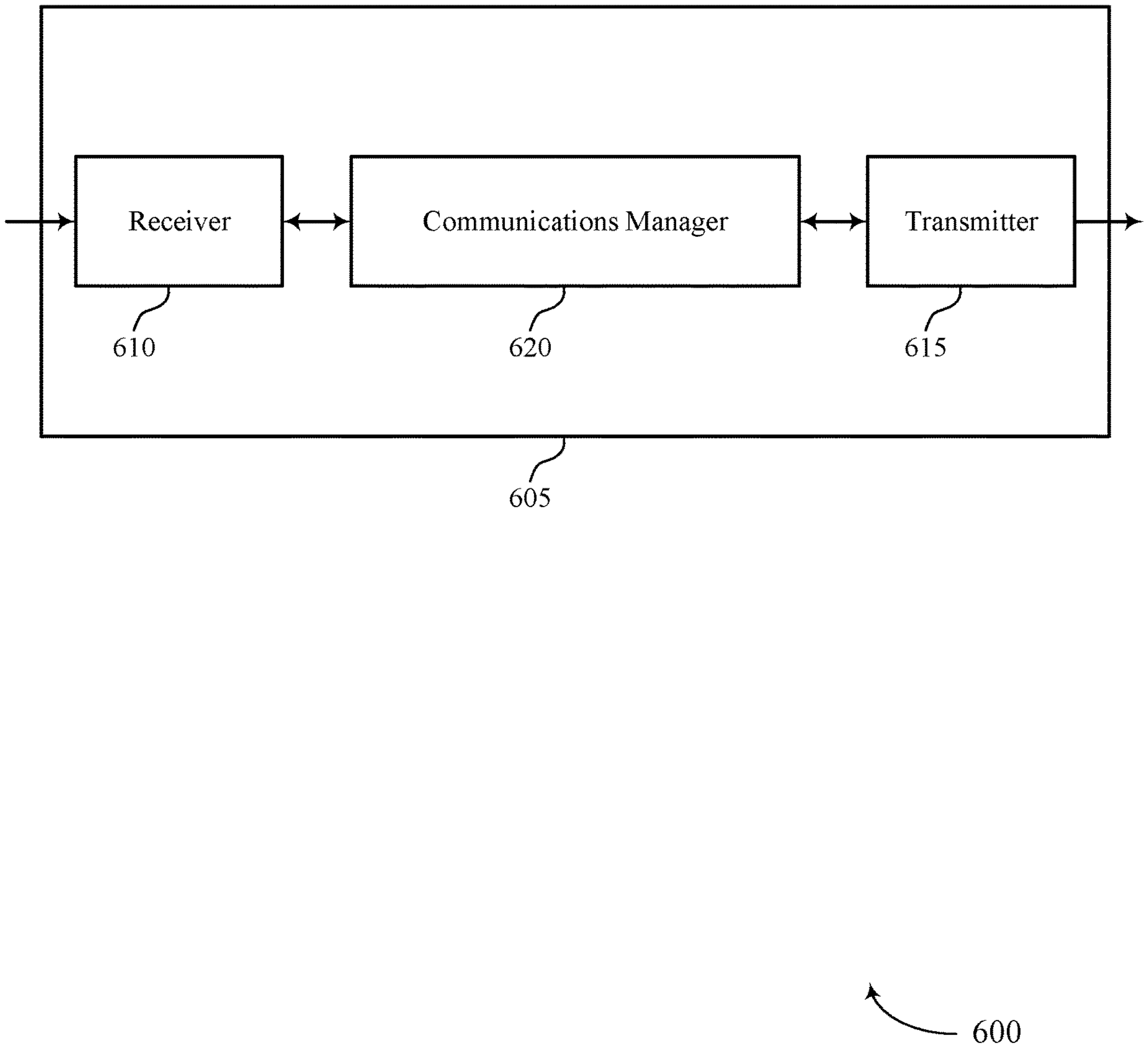
FIGS. 6 and 7 show block diagrams of devices that support resource quantization for GI-based waveforms in accordance with one or more aspects of the present disclosure.

FIG. 6 shows a block diagram 600 of a device 605 that supports resource quantization for GI-based waveforms in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to resource quantization for GI-based waveforms). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource quantization for GI-based waveforms). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of resource quantization for GI-based waveforms as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving, from a network entity, one or more first signals that indicate a resource allocation and that indicate a set of GI-based waveform parameters for a GI-based waveform associated with the UE. The communications manager 620 is capable of, configured to, or operable to support a means for receiving, from the network entity, an indication of one or more quantized resource allocation parameters associated with the GI-based waveform. The communications manager 620 is capable of, configured to, or operable to support a means for communicating the GI-based waveform with the network entity using the one or more quantized resource allocation parameters and the set of GI-based waveform parameters.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and more efficient utilization of communication resources.

Figure 7:
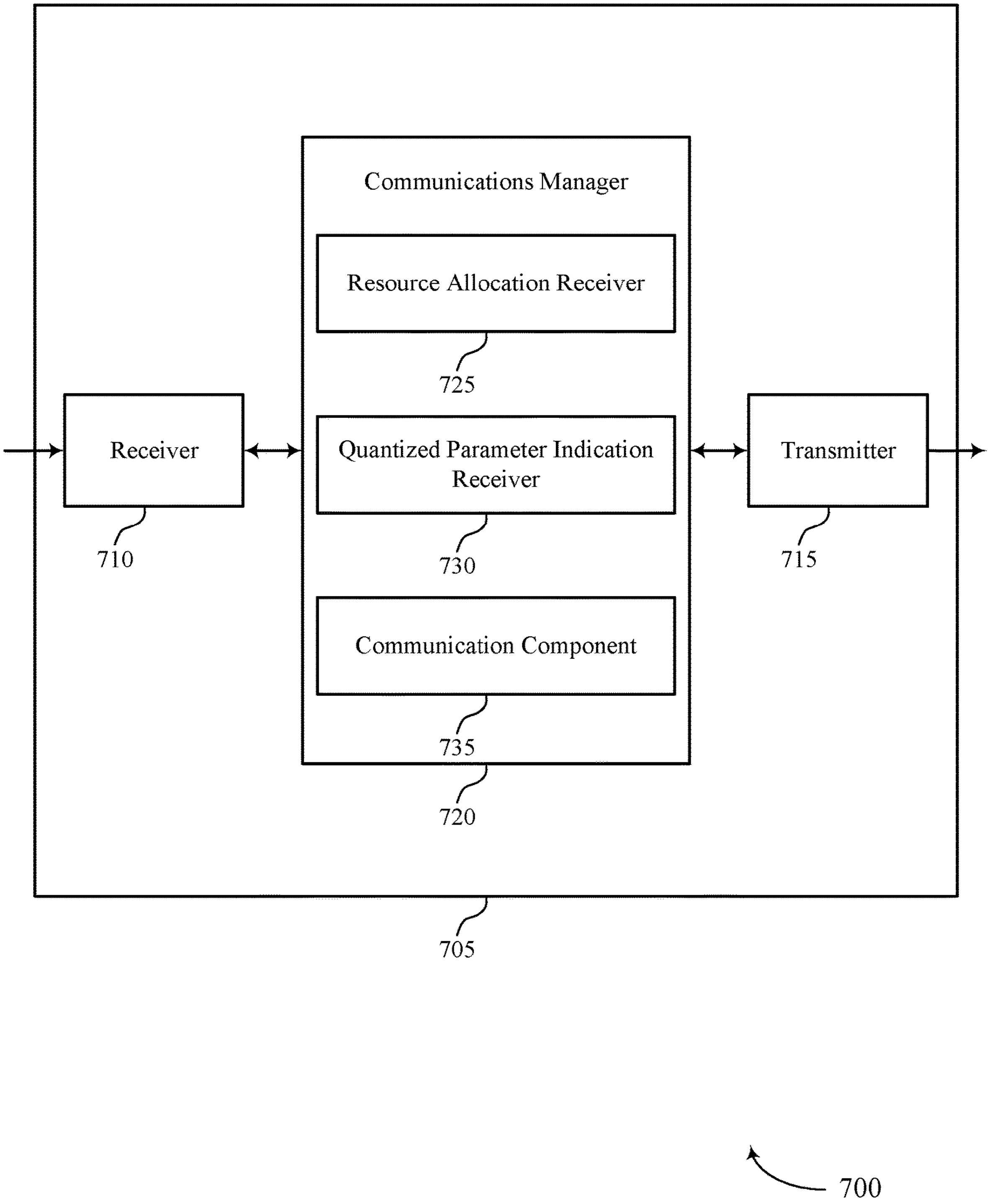

FIG. 7 shows a block diagram 700 of a device 705 that supports resource quantization for GI-based waveforms in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to resource quantization for GI-based waveforms). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to resource quantization for GI-based waveforms). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of resource quantization for GI-based waveforms as described herein. For example, the communications manager 720 may include a resource allocation receiver 725, a quantized parameter indication receiver 730, a communication component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The resource allocation receiver 725 is capable of, configured to, or operable to support a means for receiving, from a network entity, one or more first signals that indicate a resource allocation and that indicate a set of GI-based waveform parameters for a GI-based waveform associated with the UE. The quantized parameter indication receiver 730 is capable of, configured to, or operable to support a means for receiving, from the network entity, an indication of one or more quantized resource allocation parameters associated with the GI-based waveform. The communication component 735 is capable of, configured to, or operable to support a means for communicating the GI-based waveform with the network entity using the one or more quantized resource allocation parameters and the set of GI-based waveform parameters.

Figure 8:
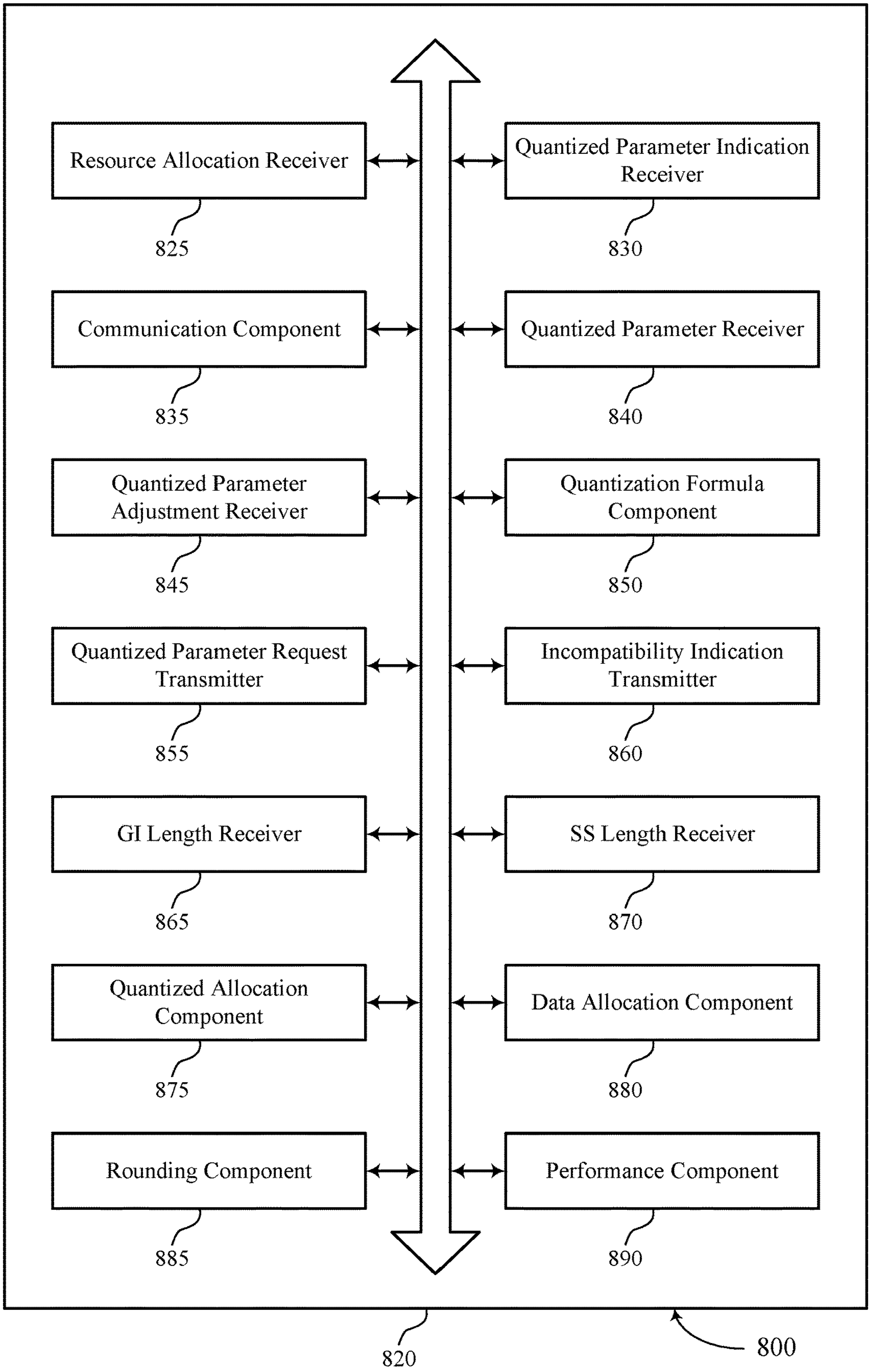
FIG. 8 shows a block diagram of a communications manager that supports resource quantization for GI-based waveforms in accordance with one or more aspects of the present disclosure.

FIG. 8 shows a block diagram 800 of a communications manager 820 that supports resource quantization for GI-based waveforms in accordance with one or more aspects of the present disclosure. The communications manager 820 may be an example of aspects of a communications manager 620, a communications manager 720, or both, as described herein. The communications manager 820, or various components thereof, may be an example of means for performing various aspects of resource quantization for GI-based waveforms as described herein. For example, the communications manager 820 may include a resource allocation receiver 825, a quantized parameter indication receiver 830, a communication component 835, a quantized parameter receiver 840, a quantized parameter adjustment receiver 845, a quantization formula component 850, a quantized parameter request transmitter 855, an incompatibility indication transmitter 860, a GI length receiver 865, an SS length receiver 870, a quantized allocation component 875, a data allocation component 880, a rounding component 885, a performance component 890, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The resource allocation receiver 825 is capable of, configured to, or operable to support a means for receiving, from a network entity, one or more first signals that indicate a resource allocation and that indicate a set of GI-based waveform parameters for a GI-based waveform associated with the UE. The quantized parameter indication receiver 830 is capable of, configured to, or operable to support a means for receiving, from the network entity, an indication of one or more quantized resource allocation parameters associated with the GI-based waveform. The communication component 835 is capable of, configured to, or operable to support a means for communicating the GI-based waveform with the network entity using the one or more quantized resource allocation parameters and the set of GI-based waveform parameters.

In some examples, the indication includes a configuration that indicates one or more formulas for determination of the one or more quantized resource allocation parameters.

In some examples, to support communicating the GI-based waveform with the network entity, the quantization formula component 850 is capable of, configured to, or operable to support a means for communicating the GI-based waveform with the network entity using the one or more quantized resource allocation parameters that are determined based on the one or more formulas indicated by the configuration.

In some examples, to support receiving the indication, the quantized parameter receiver 840 is capable of, configured to, or operable to support a means for receiving a message including the one or more quantized resource allocation parameters associated with the GI-based waveform.

In some examples, the quantized parameter adjustment receiver 845 is capable of, configured to, or operable to support a means for receiving, from the network entity, an indication of one or more second quantized resource allocation parameters associated with the GI-based waveform, where the one or more second quantized resource allocation parameters are different from the one or more quantized resource allocation parameters.

In some examples, the quantized parameter request transmitter 855 is capable of, configured to, or operable to support a means for transmitting, to the network entity, one or more messages requesting one or more third quantized resource allocation parameters, where the indication of the one or more second quantized resource allocation parameters is received in response to the one or more messages.

In some examples, the incompatibility indication transmitter 860 is capable of, configured to, or operable to support a means for transmitting, to the network entity, one or more messages indicating an incompatibility for the one or more quantized resource allocation parameters, where the indication of the one or more second quantized resource allocation parameters is received in response to the one or more messages.

In some examples, the one or more quantized resource allocation parameters include one or more GI length parameters, one or more SS length parameters, or a combination thereof, where the one or more quantized resource allocation parameters are quantized according to a quantization grid.

In some examples, the GI length receiver 865 is capable of, configured to, or operable to support a means for receiving one or more signals that indicate a head GI length in a time domain, a tail GI length in the time domain, or both.

In some examples, the SS length receiver 870 is capable of, configured to, or operable to support a means for receiving one or more signals indicating a head SS length in a time domain or a pre-transform domain, a tail SS length in the time domain or the pre-transform domain, or both.

In some examples, the quantized allocation component 875 is capable of, configured to, or operable to support a means for determining an allocation of one or more resource blocks or one or more tones based on a quantization of the one or more GI length parameters, of the one or more SS length parameters, or of both.

In some examples, the data allocation component 880 is capable of, configured to, or operable to support a means for determining a data allocation of one or more resource blocks or one or more tones based on a difference between the allocation and the quantized one or more GI length parameters, the quantized one or more SS length parameters, or both. Additionally, or alternatively, the data allocation may correspond to an allocation for a control signal, an allocation for a reference signal, or the like. For example, the data allocation may exclude GI or SS length parameters.

In some examples, the quantization of the one or more GI length parameters, of the one or more SS length parameters, or of both is based on a rounding based quantization, a deviation based quantization, or a combination thereof. Additionally, or alternatively, the rounding based quantization may be associated with resource block grid rounding, integer grid rounding, or both.

In some examples, the quantization of the one or more GI length parameters, of the one or more SS length parameters, or of both is based on a modulation and coding scheme, a symbol type, a delay spread, an allocated bandwidth, an error target, a throughput target, or a combination thereof.

Figure 9:
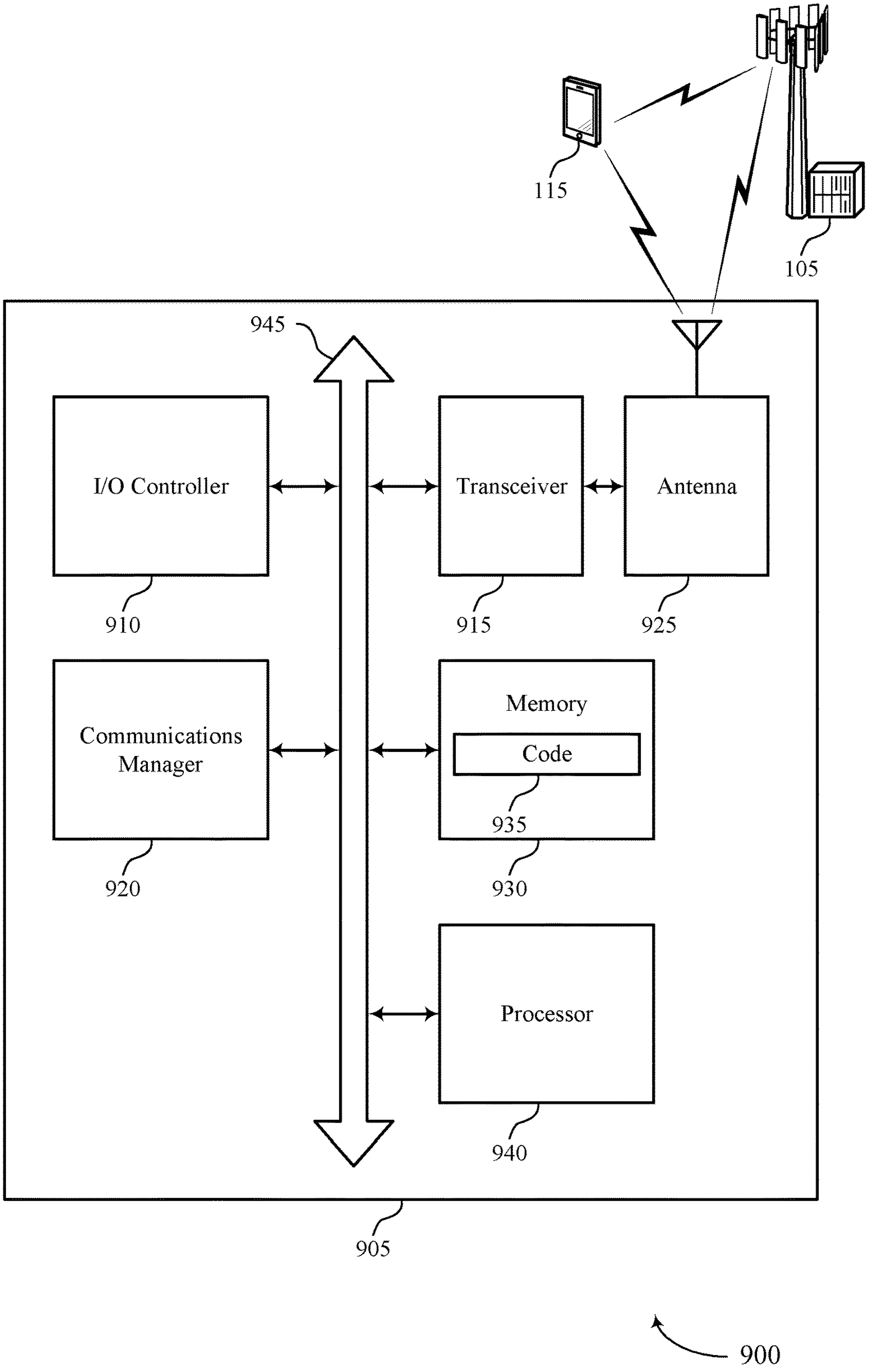
FIG. 9 shows a diagram of a system including a device that supports resource quantization for GI-based waveforms in accordance with one or more aspects of the present disclosure.

FIG. 9 shows a diagram of a system 900 including a device 905 that supports resource quantization for GI-based waveforms in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting resource quantization for GI-based waveforms). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving, from a network entity, one or more first signals that indicate a resource allocation and that indicate a set of GI-based waveform parameters for a GI-based waveform associated with the UE. The communications manager 920 is capable of, configured to, or operable to support a means for receiving, from the network entity, an indication of one or more quantized resource allocation parameters associated with the GI-based waveform. The communications manager 920 is capable of, configured to, or operable to support a means for communicating the GI-based waveform with the network entity using the one or more quantized resource allocation parameters and the set of GI-based waveform parameters.

By including or configuring the communications manager 920 in accordance with examples as described herein, the device 905 may support techniques for improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of resource quantization for GI-based waveforms as described herein, or the at least one processor 940 and the at least one memory 930 may be otherwise configured to, individually or collectively, perform or support such operations.

Figure 10:
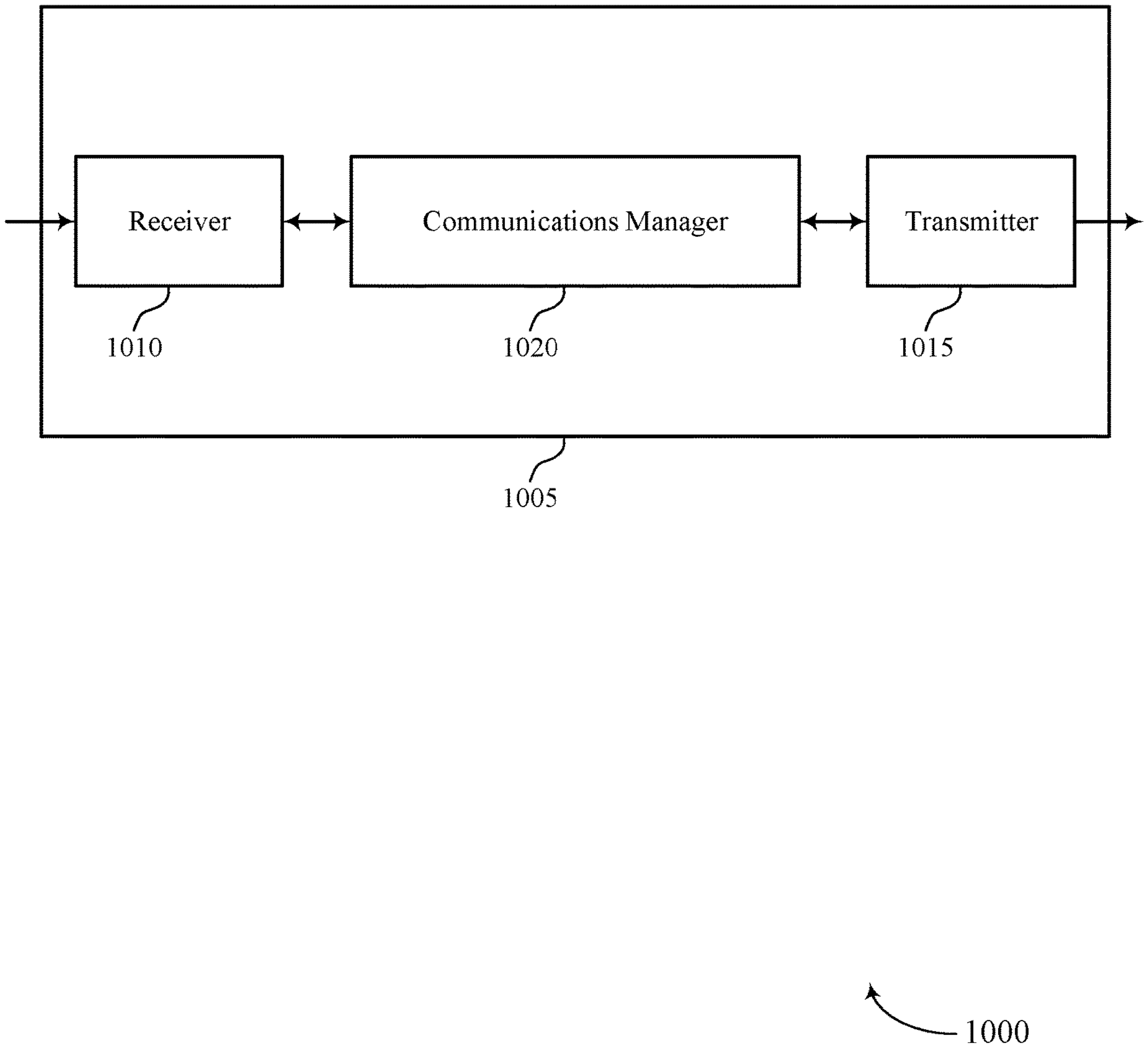
FIGS. 10 and 11 show block diagrams of devices that support resource quantization for GI-based waveforms in accordance with one or more aspects of the present disclosure.

FIG. 10 shows a block diagram 1000 of a device 1005 that supports resource quantization for GI-based waveforms in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of resource quantization for GI-based waveforms as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting, to a UE, one or more first signals that indicate a resource allocation and that indicate a set of GI-based waveform parameters for a GI-based waveform associated with the UE. The communications manager 1020 is capable of, configured to, or operable to support a means for transmitting, to the UE, an indication of one or more quantized resource allocation parameters associated with the GI-based waveform. The communications manager 1020 is capable of, configured to, or operable to support a means for communicating the GI-based waveform with the UE using the one or more quantized resource allocation parameters and the set of GI-based waveform parameters.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
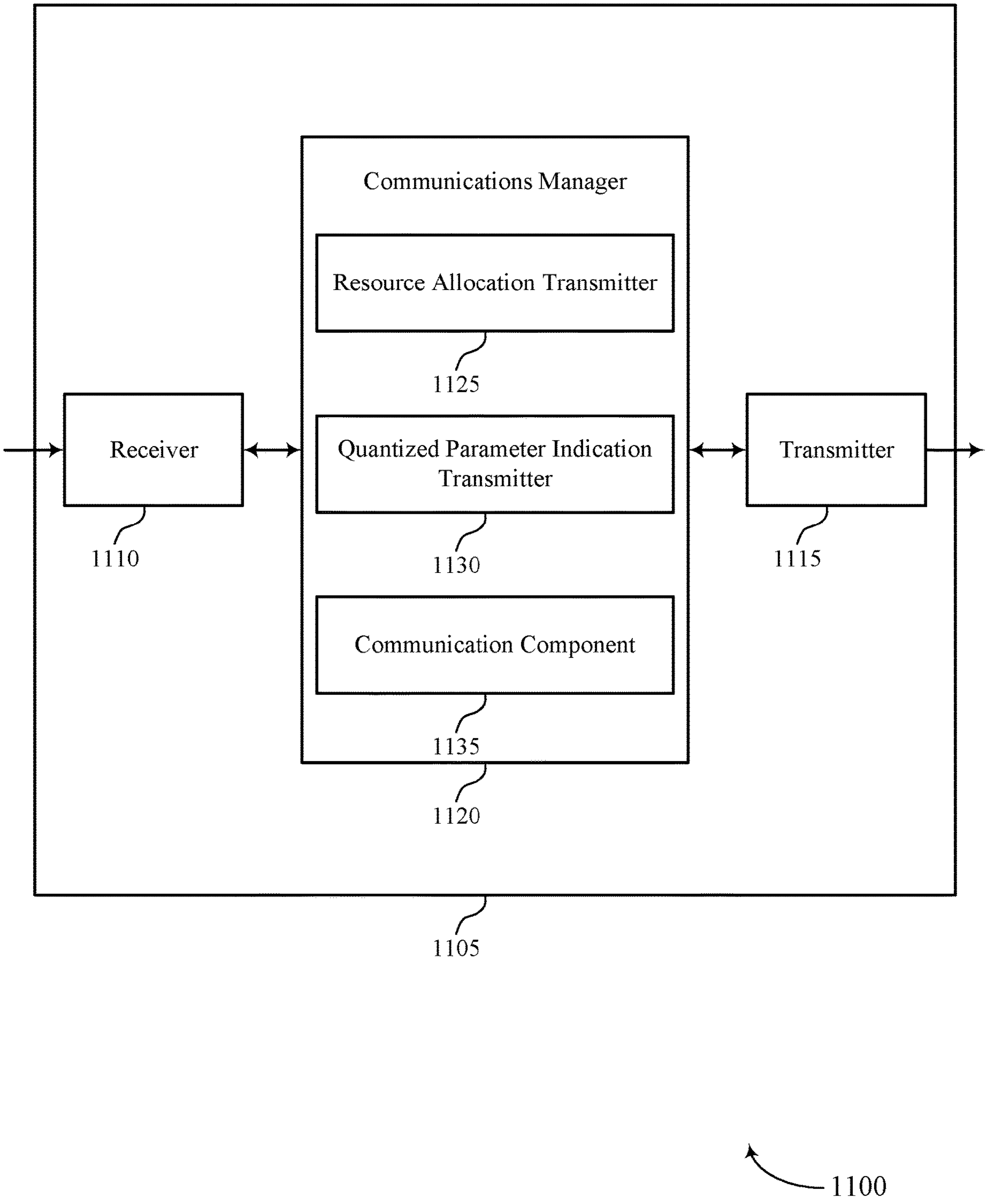

FIG. 11 shows a block diagram 1100 of a device 1105 that supports resource quantization for GI-based waveforms in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of resource quantization for GI-based waveforms as described herein. For example, the communications manager 1120 may include a resource allocation transmitter 1125, a quantized parameter indication transmitter 1130, a communication component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The resource allocation transmitter 1125 is capable of, configured to, or operable to support a means for transmitting, to a UE, one or more first signals that indicate a resource allocation and that indicate a set of GI-based waveform parameters for a GI-based waveform associated with the UE. The quantized parameter indication transmitter 1130 is capable of, configured to, or operable to support a means for transmitting, to the UE, an indication of one or more quantized resource allocation parameters associated with the GI-based waveform. The communication component 1135 is capable of, configured to, or operable to support a means for communicating the GI-based waveform with the UE using the one or more quantized resource allocation parameters and the set of GI-based waveform parameters.

Figure 12:
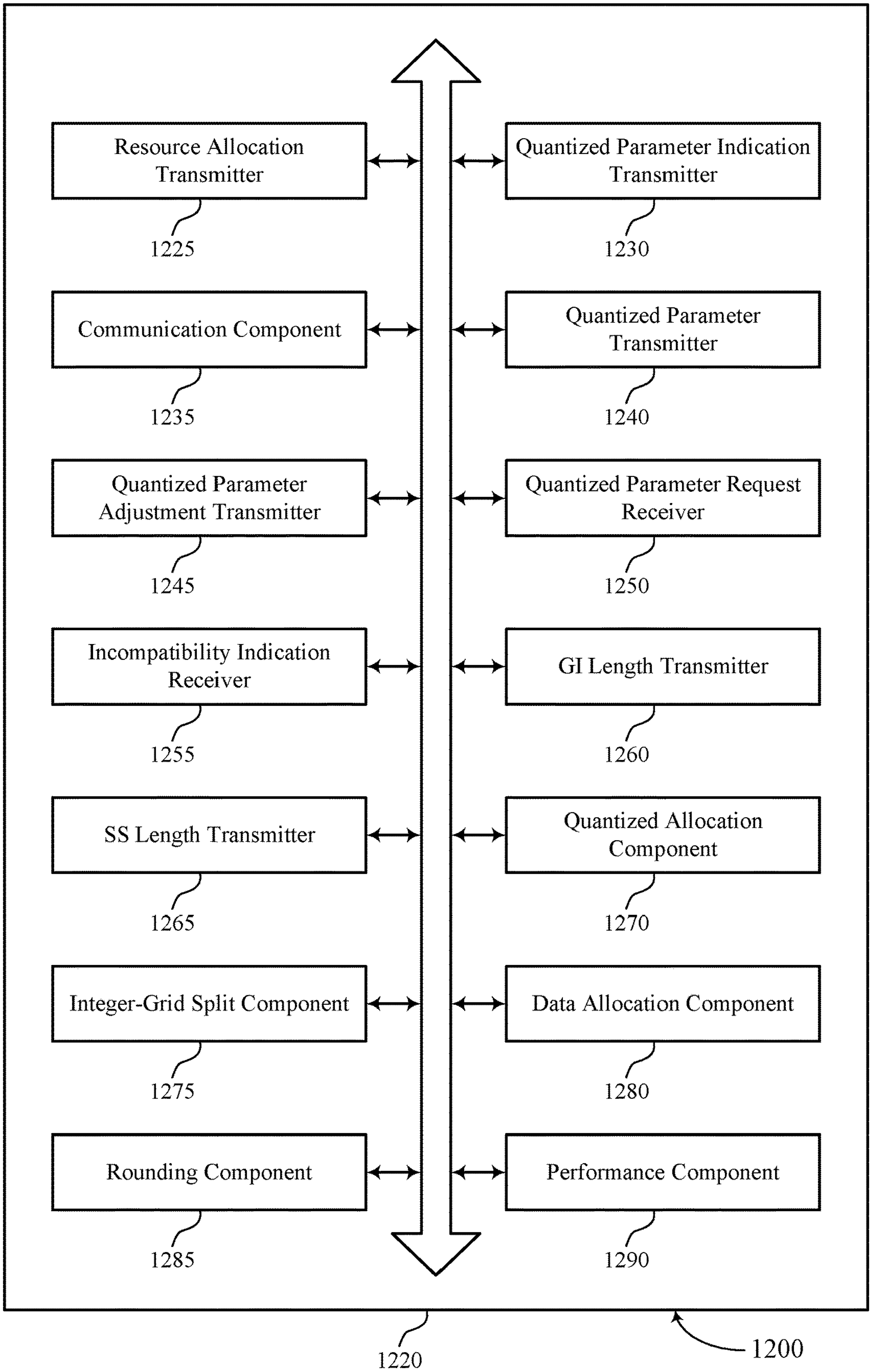
FIG. 12 shows a block diagram of a communications manager that supports resource quantization for GI-based waveforms in accordance with one or more aspects of the present disclosure.

FIG. 12 shows a block diagram 1200 of a communications manager 1220 that supports resource quantization for GI-based waveforms in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of resource quantization for GI-based waveforms as described herein. For example, the communications manager 1220 may include a resource allocation transmitter 1225, a quantized parameter indication transmitter 1230, a communication component 1235, a quantized parameter transmitter 1240, a quantized parameter adjustment transmitter 1245, a quantized parameter request receiver 1250, an incompatibility indication receiver 1255, a GI length transmitter 1260, an SS length transmitter 1265, a quantized allocation component 1270, an integer-grid split component 1275, a data allocation component 1280, a rounding component 1285, a performance component 1290, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The resource allocation transmitter 1225 is capable of, configured to, or operable to support a means for transmitting, to a UE, one or more first signals that indicate a resource allocation and that indicate a set of GI-based waveform parameters for a GI-based waveform associated with the UE. The quantized parameter indication transmitter 1230 is capable of, configured to, or operable to support a means for transmitting, to the UE, an indication of one or more quantized resource allocation parameters associated with the GI-based waveform. The communication component 1235 is capable of, configured to, or operable to support a means for communicating the GI-based waveform with the UE using the one or more quantized resource allocation parameters and the set of GI-based waveform parameters.

In some examples, the indication includes a configuration that indicates one or more formulas for determination of the one or more quantized resource allocation parameters.

In some examples, to support transmitting the indication, the quantized parameter transmitter 1240 is capable of, configured to, or operable to support a means for transmitting a message including the one or more quantized resource allocation parameters associated with the GI-based waveform.

In some examples, the quantized parameter adjustment transmitter 1245 is capable of, configured to, or operable to support a means for transmitting, to the UE, an indication of one or more second quantized resource allocation parameters associated with the GI-based waveform, where the one or more second quantized resource allocation parameters are different than the one or more quantized resource allocation parameters.

In some examples, the quantized parameter request receiver 1250 is capable of, configured to, or operable to support a means for receiving, from the UE, one or more messages requesting one or more third quantized resource allocation parameters, where the indication of the one or more second quantized resource allocation parameters is received in response to the one or more messages.

In some examples, the incompatibility indication receiver 1255 is capable of, configured to, or operable to support a means for receiving, from the UE, one or more messages indicating an incompatibility for the one or more quantized resource allocation parameters, where the indication of the one or more second quantized resource allocation parameters is received in response to the one or more messages.

In some examples, the one or more quantized resource allocation parameters include one or more GI length parameters, one or more SS length parameters, or a combination thereof, where the one or more quantized resource allocation parameters are quantized according to a quantization grid.

In some examples, the GI length transmitter 1260 is capable of, configured to, or operable to support a means for transmitting one or more signals that indicate a head GI length in a time domain, a tail GI length in the time domain, or both.

In some examples, the SS length transmitter 1265 is capable of, configured to, or operable to support a means for transmitting one or more signals indicating a head SS length in a time domain or a pre-transform domain, a tail SS length in a time domain or a pre-transform domain, or both.

In some examples, the quantized allocation component 1270 is capable of, configured to, or operable to support a means for determining an allocation of one or more resource blocks or one or more tones based on a quantization of the one or more GI length parameters, of the one or more SS length parameters, or of both.

In some examples, the data allocation component 1280 is capable of, configured to, or operable to support a means for determining a data allocation of one or more resource blocks or one or more tones based on a difference between the allocation and the quantized one or more GI length parameters, the quantized one or more SS length parameters, or both.

In some examples, the quantization of the one or more GI length parameters, of the one or more SS length parameters, or of both is based on a rounding based quantization, a deviation based quantization, or a combination thereof.

In some examples, the quantization of the one or more GI length parameters, of the one or more SS length parameters, or of both is based on a modulation and coding scheme, a symbol type, a delay spread, an allocated bandwidth, an error target, a throughput target or a combination thereof.

In some examples, the integer-grid split component 1275 is capable of, configured to, or operable to support a means for determining a GI length of the one or more GI length parameters and a SS length of the one or more SS length parameters based on a total quantized GI length and the SS length.

In some examples, a quantization of the GI length and the SS length is to a first grid, a second grid, or both, where the first grid is a resource block grid and the second grid is an integer grid.

Figure 13:
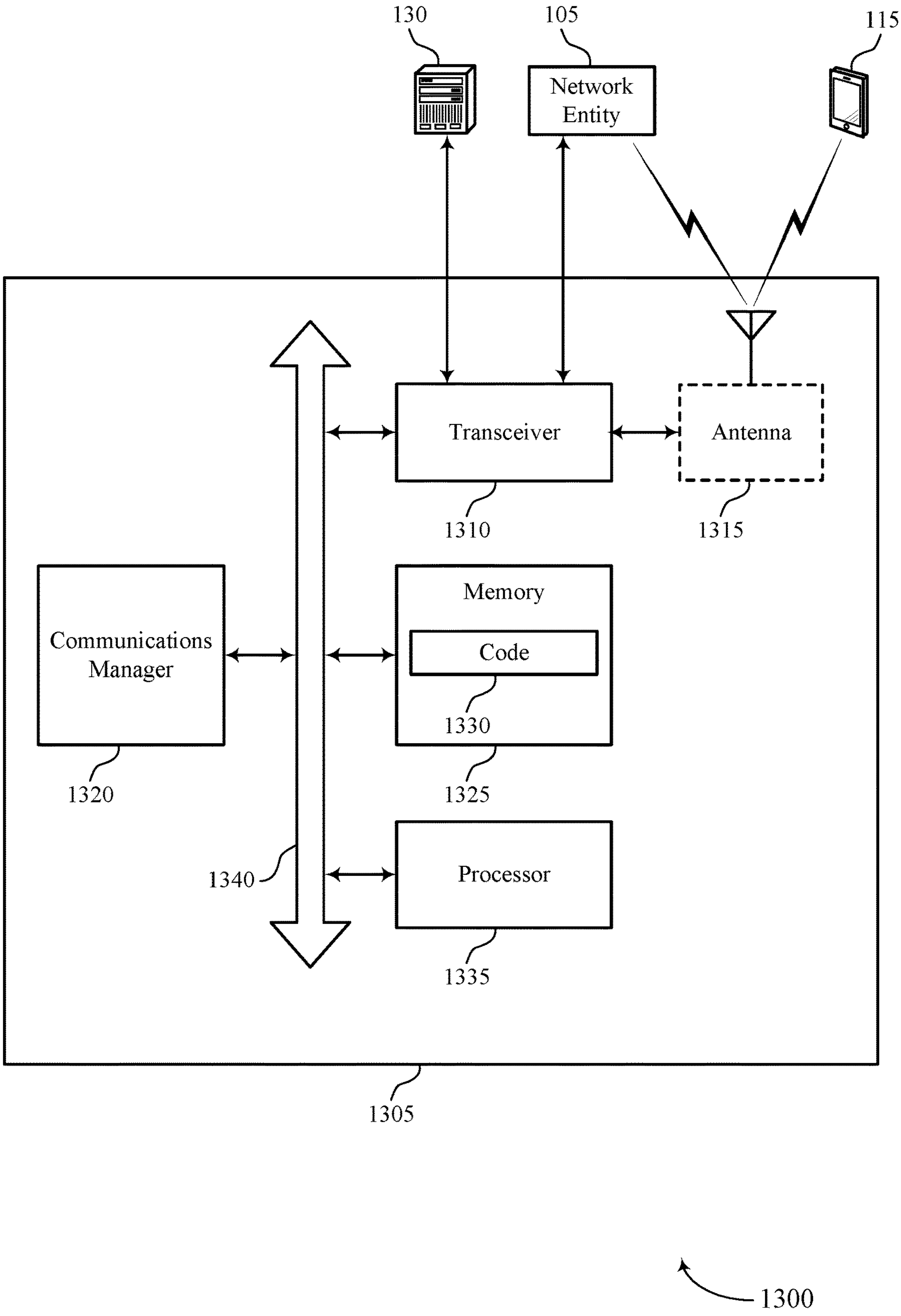
FIG. 13 shows a diagram of a system including a device that supports resource quantization for GI-based waveforms in accordance with one or more aspects of the present disclosure.

FIG. 13 shows a diagram of a system 1300 including a device 1305 that supports resource quantization for GI-based waveforms in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting resource quantization for GI-based waveforms). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. As such, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for transmitting, to a UE, one or more first signals that indicate a resource allocation and that indicate a set of GI-based waveform parameters for a GI-based waveform associated with the UE. The communications manager 1320 is capable of, configured to, or operable to support a means for transmitting, to the UE, an indication of one or more quantized resource allocation parameters associated with the GI-based waveform. The communications manager 1320 is capable of, configured to, or operable to support a means for communicating the GI-based waveform with the UE using the one or more quantized resource allocation parameters and the set of GI-based waveform parameters.

By including or configuring the communications manager 1320 in accordance with examples as described herein, the device 1305 may support techniques for, improved user experience related to reduced processing, reduced power consumption, more efficient utilization of communication resources, improved coordination between devices, longer battery life, improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of resource quantization for GI-based waveforms as described herein, or the at least one processor 1335 and the at least one memory 1325 may be otherwise configured to, individually or collectively, perform or support such operations.

Figure 14:
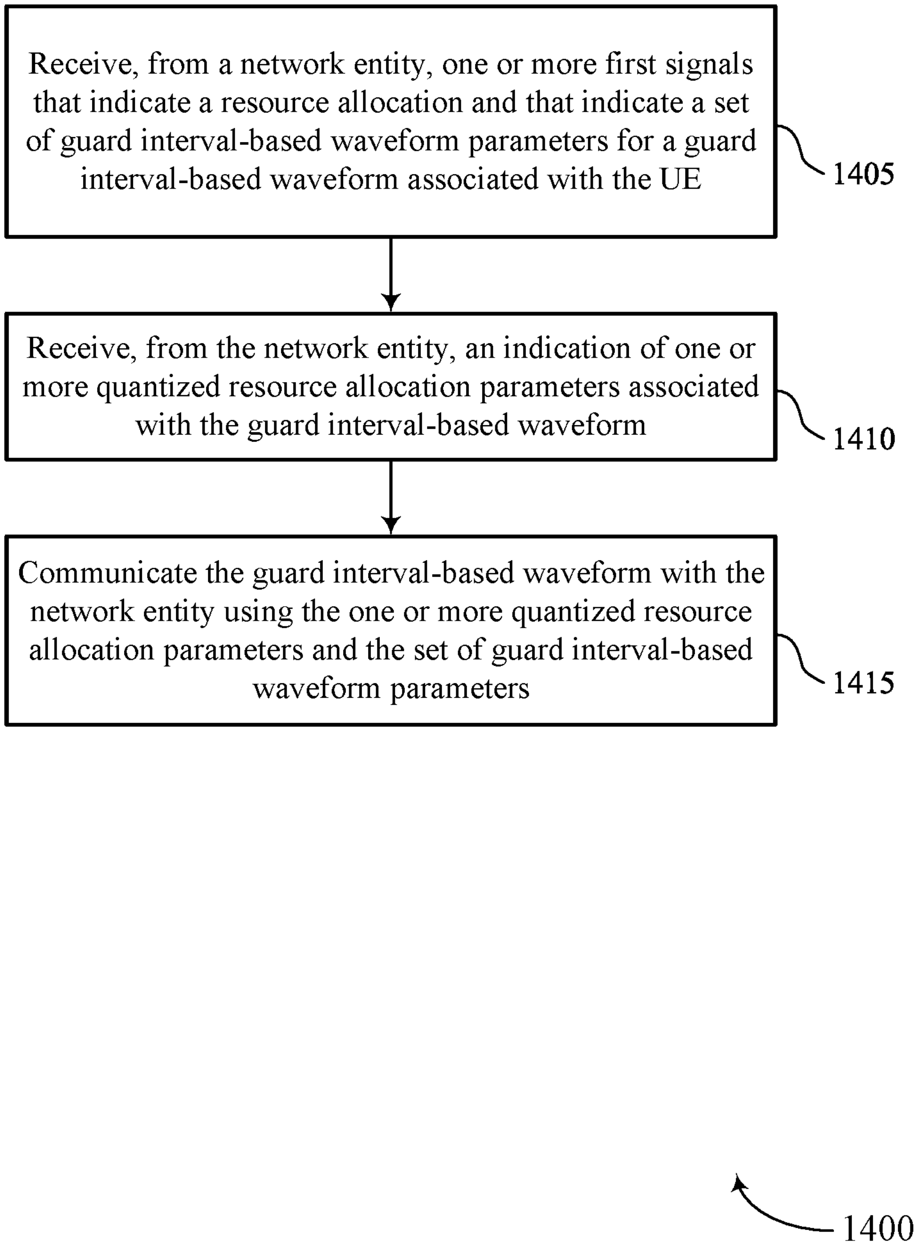
FIGS. 14 through 16 show flowcharts illustrating methods that support resource quantization for GI-based waveforms in accordance with one or more aspects of the present disclosure.

FIG. 14 shows a flowchart illustrating a method 1400 that supports resource quantization for GI-based waveforms in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, one or more first signals that indicate a resource allocation and that indicate a set of GI-based waveform parameters for a GI-based waveform associated with the UE. The operations of block 1405 may be performed in accordance with examples as disclosed herein. In some examples, aspects of the operations of 1405 may be performed by a resource allocation receiver 825 as described with reference to FIG. 8.

At 1410, the method may include receiving, from the network entity, an indication of one or more quantized resource allocation parameters associated with the GI-based waveform. The operations of block 1410 may be performed in accordance with examples as disclosed herein. In some examples, aspects of the operations of 1410 may be performed by a quantized parameter indication receiver 830 as described with reference to FIG. 8.

At 1415, the method may include communicating the GI-based waveform with the network entity using the one or more quantized resource allocation parameters and the set of GI-based waveform parameters. The operations of block 1415 may be performed in accordance with examples as disclosed herein. In some examples, aspects of the operations of 1415 may be performed by a communication component 835 as described with reference to FIG. 8.

Figure 15:
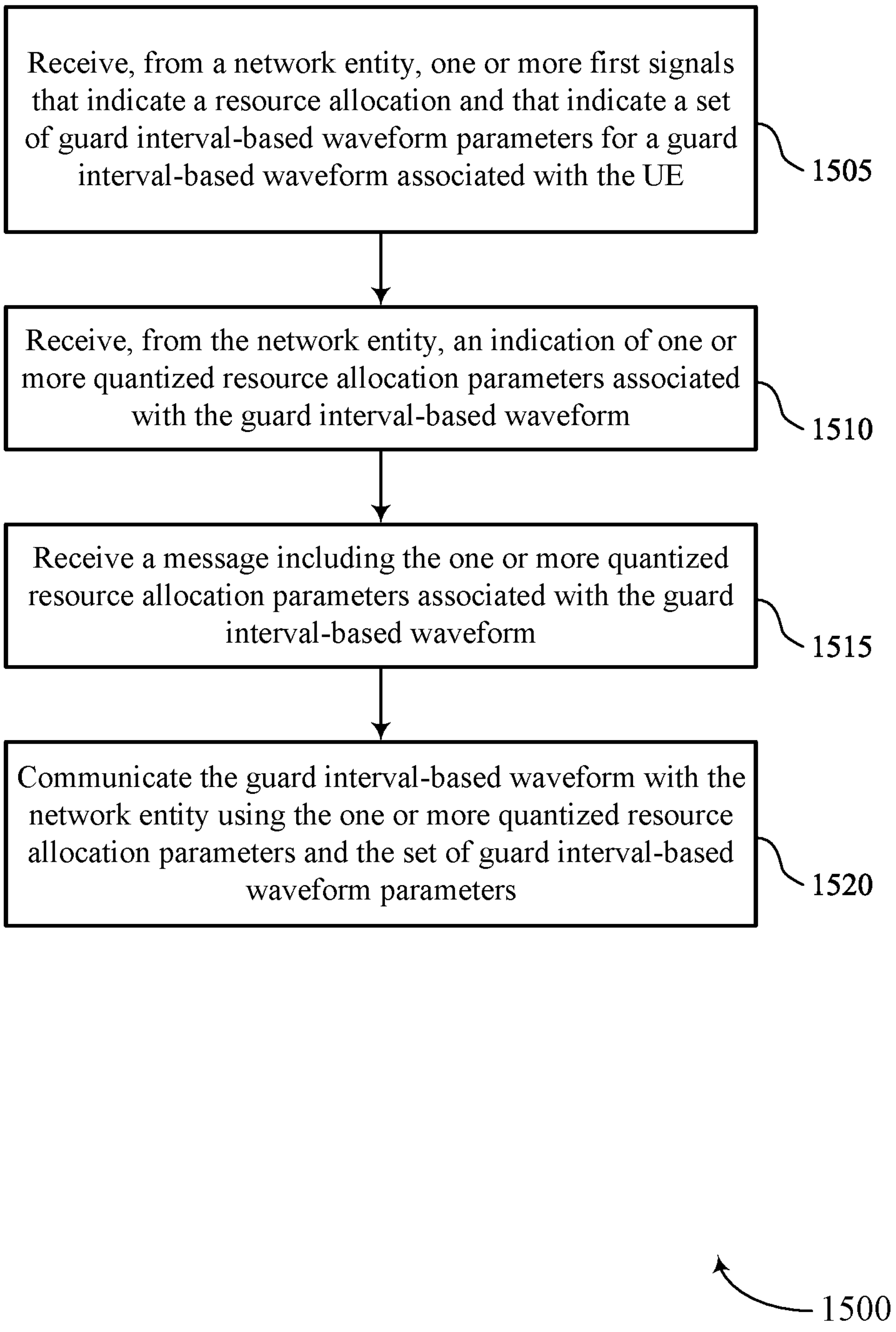

FIG. 15 shows a flowchart illustrating a method 1500 that supports resource quantization for GI-based waveforms in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, one or more first signals that indicate a resource allocation and that indicate a set of GI-based waveform parameters for a GI-based waveform associated with the UE. The operations of block 1505 may be performed in accordance with examples as disclosed herein. In some examples, aspects of the operations of 1505 may be performed by a resource allocation receiver 825 as described with reference to FIG. 8.

At 1510, the method may include receiving, from the network entity, an indication of one or more quantized resource allocation parameters associated with the GI-based waveform. The operations of block 1510 may be performed in accordance with examples as disclosed herein. In some examples, aspects of the operations of 1510 may be performed by a quantized parameter indication receiver 830 as described with reference to FIG. 8.

At 1515, the method may include receiving a message including the one or more quantized resource allocation parameters associated with the GI-based waveform. The operations of block 1515 may be performed in accordance with examples as disclosed herein. In some examples, aspects of the operations of 1515 may be performed by a quantized parameter receiver 840 as described with reference to FIG. 8.

At 1520, the method may include communicating the GI-based waveform with the network entity using the one or more quantized resource allocation parameters and the set of GI-based waveform parameters. The operations of block 1520 may be performed in accordance with examples as disclosed herein. In some examples, aspects of the operations of 1520 may be performed by a communication component 835 as described with reference to FIG. 8.

Figure 16:
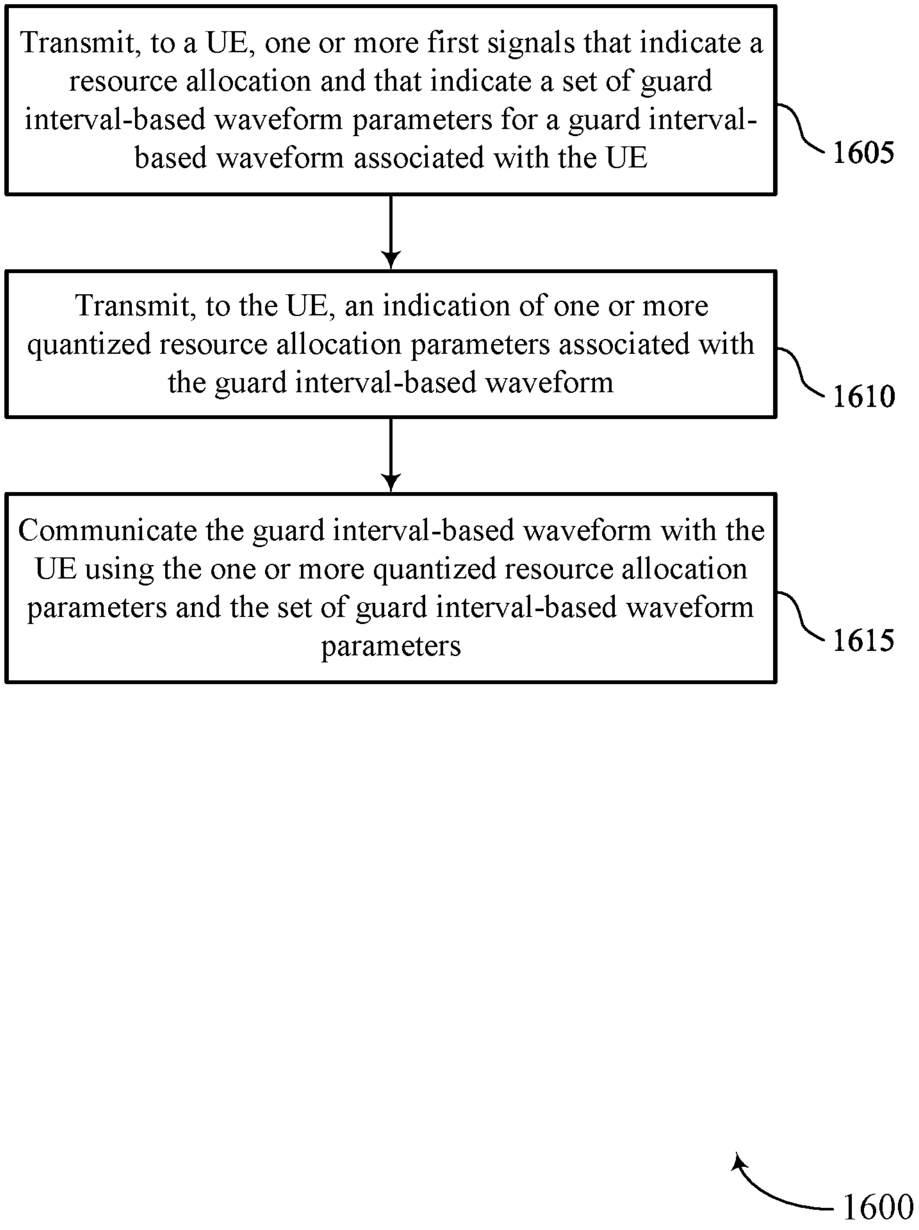

FIG. 16 shows a flowchart illustrating a method 1600 that supports resource quantization for GI-based waveforms in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, one or more first signals that indicate a resource allocation and that indicate a set of GI-based waveform parameters for a GI-based waveform associated with the UE. The operations of block 1605 may be performed in accordance with examples as disclosed herein. In some examples, aspects of the operations of 1605 may be performed by a resource allocation transmitter 1225 as described with reference to FIG. 12.

At 1610, the method may include transmitting, to the UE, an indication of one or more quantized resource allocation parameters associated with the GI-based waveform. The operations of block 1610 may be performed in accordance with examples as disclosed herein. In some examples, aspects of the operations of 1610 may be performed by a quantized parameter indication transmitter 1230 as described with reference to FIG. 12.

At 1615, the method may include communicating the GI-based waveform with the UE using the one or more quantized resource allocation parameters and the set of GI-based waveform parameters. The operations of block 1615 may be performed in accordance with examples as disclosed herein. In some examples, aspects of the operations of 1615 may be performed by a communication component 1235 as described with reference to FIG. 12.

The following provides an overview of aspects of the present disclosure:

Aspect 1: A method for wireless communications at a UE, comprising: receiving, from a network entity, one or more first signals that indicate a resource allocation and that indicate a set of GI-based waveform parameters for a GI-based waveform associated with the UE; receiving, from the network entity, an indication of one or more quantized resource allocation parameters associated with the GI-based waveform; and communicating the GI-based waveform with the network entity using the one or more quantized resource allocation parameters and the set of GI-based waveform parameters.

Aspect 2: The method of aspect 1, wherein the indication comprises a configuration that indicates one or more formulas for determination of the one or more quantized resource allocation parameters.

Aspect 3: The method of aspect 2, wherein communicating the GI-based waveform with the network entity comprises: communicating the GI-based waveform with the network entity using the one or more quantized resource allocation parameters that are determined based at least in part on the one or more formulas indicated by the configuration.

Aspect 4: The method of any of aspects 1 through 3, wherein receiving the indication comprises: receiving a message comprising the one or more quantized resource allocation parameters associated with the GI-based waveform.

Aspect 5: The method of any of aspects 1 through 4, further comprising: receiving, from the network entity, an indication of one or more second quantized resource allocation parameters associated with the GI-based waveform, wherein the one or more second quantized resource parameters are different from the one or more resource allocation parameters.

Aspect 6: The method of aspect 5, further comprising: transmitting, to the network entity, one or more messages requesting one or more third quantized resource allocation parameters, wherein the indication of the one or more second quantized resource allocation parameters is received in response to the one or more messages.

Aspect 7: The method of any of aspects 5 through 6, further comprising: transmitting, to the network entity, one or more messages indicating an incompatibility for the one or more quantized resource allocation parameters, wherein the indication of the one or more second quantized resource allocation parameters is received in response to the one or more messages.

Aspect 8: The method of any of aspects 1 through 7, wherein the one or more quantized resource allocation parameters comprise one or more GI length parameters, one or more SS length parameters, or a combination thereof, wherein the one or more quantized resource allocation parameters are quantized according to a quantization grid.

Aspect 9: The method of aspect 8, further comprising: receiving one or more signals that indicate a head GI length in a time domain, a tail GI length in the time domain, or both.

Aspect 10: The method of any of aspects 8 through 9, further comprising: receiving one or more signals indicating a head SS length in a time domain or a pre-transform domain, a tail SS length in the time domain or the pre-transform domain, or both.

Aspect 11: The method of any of aspects 8 through 10, further comprising: determining an allocation of one or more resource blocks or one or more tones based at least in part on a quantization of the one or more GI length parameters, of the one or more SS length parameters, or of both.

Aspect 12: The method of aspect 11, further comprising: determining a data allocation of one or more resource blocks or one or more tones based at least in part on a difference between the allocation and the quantized one or more GI length parameters, the quantized one or more SS length parameters, or both.

Aspect 13: The method of any of aspects 11 through 12, wherein the quantization of the one or more GI length parameters, of the one or more SS length parameters, or of both is based at least in part on a rounding based quantization, a deviation based quantization, or a combination thereof.

Aspect 14: The method of any of aspects 11 through 13, wherein the quantization of the one or more GI length parameters, of the one or more SS length parameters, or of both is based at least in part on a modulation and coding scheme, a symbol type, a delay spread, an allocated bandwidth, an error target, a throughput target, or a combination thereof.

Aspect 15: A method for wireless communications at a network entity, comprising: transmitting, to a UE, one or more first signals that indicate a resource allocation and that indicate a set of GI-based waveform parameters for a GI-based waveform associated with the UE; transmitting, to the UE, an indication of one or more quantized resource allocation parameters associated with the GI-based waveform; and communicating the GI-based waveform with the UE using the one or more quantized resource allocation parameters and the set of GI-based waveform parameters.

Aspect 16: The method of aspect 15, wherein the indication comprises a configuration that indicates one or more formulas for determination of the one or more quantized resource allocation parameters.

Aspect 17: The method of any of aspects 15 through 16, wherein transmitting the indication comprises: transmitting a message comprising the one or more quantized resource allocation parameters associated with the GI-based waveform.

Aspect 18: The method of any of aspects 15 through 17, further comprising: transmitting, to the UE, an indication of one or more second quantized resource allocation parameters associated with the GI-based waveform, wherein the one or more second quantized resource parameters are different than the one or more resource allocation parameters.

Aspect 19: The method of aspect 18, further comprising: receiving, from the UE, one or more messages requesting one or more third quantized resource allocation parameters, wherein the indication of the one or more second quantized resource allocation parameters is received in response to the one or more messages.

Aspect 20: The method of any of aspects 18 through 19, further comprising: receiving, from the UE, one or more messages indicating an incompatibility for the one or more quantized resource allocation parameters, wherein the indication of the one or more second quantized resource allocation parameters is received in response to the one or more messages.

Aspect 21: The method of any of aspects 15 through 20, wherein the one or more quantized resource allocation parameters comprise one or more GI length parameters, one or more SS length parameters, or a combination thereof, wherein the one or more quantized resource allocation parameters are quantized according to a quantization grid.

Aspect 22: The method of aspect 21, further comprising: transmitting one or more signals that indicate a head GI length in a time domain, a tail GI length in the time domain, or both.

Aspect 23: The method of any of aspects 21 through 22, further comprising: transmitting one or more signals indicating a head SS length in a time domain or a pre-transform domain, a tail SS length in a time domain or a pre-transform domain, or both.

Aspect 24: The method of any of aspects 21 through 23, further comprising: determining an allocation of one or more resource blocks or one or more tones based at least in part on a quantization of the one or more GI length parameters, of the one or more SS length parameters, or of both.

Aspect 25: The method of aspect 24, further comprising: determining a data allocation of one or more resource blocks or one or more tones based at least in part on a difference between the allocation and the quantized one or more GI length parameters, the quantized one or more SS length parameters, or both.

Aspect 26: The method of any of aspects 24 through 25, wherein the quantization of the one or more GI length parameters, of the one or more SS length parameters, or of both is based at least in part on a rounding based quantization, a deviation based quantization, or a combination thereof.

Aspect 27: The method of any of aspects 24 through 26, wherein the quantization of the one or more GI length parameters, of the one or more SS length parameters, or of both is based at least in part on a modulation and coding scheme, a symbol type, a delay spread, an allocated bandwidth, an error target, a throughput target or a combination thereof.

Aspect 28: The method of any of aspects 21 through 27, further comprising: determining a GI length of the one or more GI length parameters and a SS length of the one or more SS length parameters based at least in part on a total quantized GI length and the SS length.

Aspect 29: The method of aspect 28, wherein a quantization of the GI length and the SS length is to a first grid, a second grid, or both, wherein the first grid is a resource block grid and the second grid is an integer grid.

Aspect 30: A UE for wireless communications, comprising one or more memories storing processor-executable code, and one or more processors coupled with the one or more memories and individually or collectively operable to execute the code to cause the UE to perform a method of any of aspects 1 through 14.

Aspect 31: A UE for wireless communications, comprising at least one means for performing a method of any of aspects 1 through 14.

Aspect 32: A non-transitory computer-readable medium storing code for wireless communications, the code comprising instructions executable by a processor to perform a method of any of aspects 1 through 14.

Aspect 33: A network entity for wireless communications, comprising one or more memories storing processor-executable code, and one or more processors coupled with the one or more memories and individually or collectively operable to execute the code to cause the network entity to perform a method of any of aspects 15 through 29.

Aspect 34: A network entity for wireless communications, comprising at least one means for performing a method of any of aspects 15 through 29.

Aspect 35: A non-transitory computer-readable medium storing code for wireless communications, the code comprising instructions executable by a processor to perform a method of any of aspects 15 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive, from a network entity, one or more first signals that indicate a resource allocation and that indicate a set of guard interval-based waveform parameters for a guard interval-based waveform associated with the UE;

receive, from the network entity, an indication of one or more quantized resource allocation parameters associated with the guard interval-based waveform;

communicate the guard interval-based waveform with the network entity using the one or more quantized resource allocation parameters and the set of guard interval-based waveform parameters;

receive, from the network entity, an indication of one or more second quantized resource allocation parameters associated with the guard interval-based waveform, wherein the one or more second quantized resource allocation parameters are different from the one or more quantized resource allocation parameters; and transmit, to the network entity, one or more messages requesting one or more third quantized resource allocation parameters, wherein the indication of the one or more second quantized resource allocation parameters is received in response to the one or more messages.

2. The UE of claim 1, wherein the indication comprises a configuration that indicates one or more formulas for determination of the one or more quantized resource allocation parameters.

3. The UE of claim 2, wherein, to communicate the guard interval-based waveform with the network entity, the one or more processors are individually or collectively operable to execute the code to cause the UE to:

communicate the guard interval-based waveform with the network entity using the one or more quantized resource allocation parameters that are determined based at least in part on the one or more formulas indicated by the configuration.

4. The UE of claim 1, wherein, to receive the indication, the one or more processors are individually or collectively operable to execute the code to cause the UE to:

receive a message comprising the one or more quantized resource allocation parameters associated with the guard interval-based waveform.

5. The UE of claim 1, wherein the one or more processors are individually or collectively further operable to execute the code to cause the UE to:

transmit, to the network entity, at least one message indicating an incompatibility for the one or more quantized resource allocation parameters, wherein the indication of the one or more second quantized resource allocation parameters is received in response to the at least one message.

6. The UE of claim 1, wherein the one or more quantized resource allocation parameters comprise one or more guard interval length parameters, one or more suppression signal length parameters, or a combination thereof, wherein the one or more quantized resource allocation parameters are quantized according to a quantization grid.

7. The UE of claim 6, wherein the one or more processors are individually or collectively further operable to execute the code to cause the UE to:

receive one or more signals that indicate a head guard interval length in a time domain, a tail guard interval length in the time domain, or both.

8. The UE of claim 6, wherein the one or more processors are individually or collectively further operable to execute the code to cause the UE to:

receive one or more signals indicating a head suppression signal length in a time domain or a pre-transform domain, a tail suppression signal length in the time domain or the pre-transform domain, or both.

9. The UE of claim 6, wherein the one or more processors are individually or collectively further operable to execute the code to cause the UE to:

determine an allocation of one or more resource blocks or one or more tones based at least in part on a quantization of the one or more guard interval length parameters, of the one or more suppression signal length parameters, or of both.

10. The UE of claim 9, wherein the one or more processors are individually or collectively further operable to execute the code to cause the UE to:

determine a data allocation of one or more resource blocks or one or more tones based at least in part on a difference between the allocation and the quantized one or more guard interval length parameters, the quantized one or more suppression signal length parameters, or both.

11. The UE of claim 9, wherein the quantization of the one or more guard interval length parameters, of the one or more suppression signal length parameters, or of both is based at least in part on a rounding based quantization, a deviation based quantization, or a combination thereof.

12. A network entity, comprising:

one or more memories storing processor-executable code; and one or more processors coupled with the one or more memories and individually or collectively operable to execute the code to cause the network entity to:

transmit, to a user equipment (UE), one or more first signals that indicate a resource allocation and that indicate a set of guard interval-based waveform parameters for a guard interval-based waveform associated with the UE;

transmit, to the UE, an indication of one or more quantized resource allocation parameters associated with the guard interval-based waveform;

communicate the guard interval-based waveform with the UE using the one or more quantized resource allocation parameters and the set of guard interval-based waveform parameters;

transmit, to the UE, an indication of one or more second quantized resource allocation parameters associated with the guard interval-based waveform, wherein the one or more second quantized resource allocation parameters are different than the one or more quantized resource allocation parameters; and receive, from the UE, one or more messages requesting one or more third quantized resource allocation parameters, wherein the indication of the one or more second quantized resource allocation parameters is transmitted in response to the one or more messages.

13. The network entity of claim 12, wherein the indication comprises a configuration that indicates one or more formulas for determination of the one or more quantized resource allocation parameters.

14. The network entity of claim 12, wherein, to transmit the indication, the one or more processors are individually or collectively operable to execute the code to cause the network entity to:

transmit a message comprising the one or more quantized resource allocation parameters associated with the guard interval-based waveform.

15. The network entity of claim 12, wherein the one or more processors are individually or collectively further operable to execute the code to cause the network entity to:

receive, from the UE, at least one message indicating an incompatibility for the one or more quantized resource allocation parameters, wherein the indication of the one or more second quantized resource allocation parameters is received in response to the at least one message.

16. The network entity of claim 12, wherein the one or more quantized resource allocation parameters comprise one or more guard interval length parameters, one or more suppression signal length parameters, or a combination thereof, wherein the one or more quantized resource allocation parameters are quantized according to a quantization grid.

17. The network entity of claim 16, wherein the one or more processors are individually or collectively further operable to execute the code to cause the network entity to:
transmit one or more signals that indicate a head guard interval length in a time domain, a tail guard interval length in the time domain, or both.

18. The network entity of claim 16, wherein the one or more processors are individually or collectively further operable to execute the code to cause the network entity to:
transmit one or more signals indicating a head suppression signal length in a time domain or a pre-transform domain, a tail suppression signal length in a time domain or a pre-transform domain, or both.

19. The network entity of claim 16, wherein the one or more processors are individually or collectively further operable to execute the code to cause the network entity to:
determine an allocation of one or more resource blocks or one or more tones based at least in part on a quantization of the one or more guard interval length parameters, of the one or more suppression signal length parameters, or of both.

20. The network entity of claim 19, wherein the one or more processors are individually or collectively further operable to execute the code to cause the network entity to:
determine a data allocation of one or more resource blocks or one or more tones based at least in part on a difference between the allocation and the quantized one or more guard interval length parameters, the quantized one or more suppression signal length parameters, or both.

21. The network entity of claim 19, wherein the quantization of the one or more guard interval length parameters, of the one or more suppression signal length parameters, or of both is based at least in part on a rounding based quantization, a deviation based quantization, or a combination thereof.

22. The network entity of claim 19, wherein the quantization of the one or more guard interval length parameters, of the one or more suppression signal length parameters, or of both is based at least in part on a modulation and coding scheme, a symbol type, a delay spread, an allocated bandwidth, an error target, a throughput target or a combination thereof.

23. The network entity of claim 16, wherein the one or more processors are individually or collectively further operable to execute the code to cause the network entity to:
determine a guard interval length of the one or more guard interval length parameters and a suppression signal length of the one or more suppression signal length parameters based at least in part on a total quantized guard interval length and the suppression signal length.

24. The network entity of claim 23, wherein a quantization of the guard interval length and the suppression signal length is to a first grid, a second grid, or both, wherein the first grid is a resource block grid and the second grid is an integer grid.

25. A method for wireless communications at a user equipment (UE), comprising:
receiving, from a network entity, one or more first signals that indicate a resource allocation and that indicate a set of guard interval-based waveform parameters for a guard interval-based waveform associated with the UE;
receiving, from the network entity, an indication of one or more quantized resource allocation parameters associated with the guard interval-based waveform;
communicating the guard interval-based waveform with the network entity using the one or more quantized resource allocation parameters and the set of guard interval-based waveform parameters;
receiving, from the network entity, an indication of one or more second quantized resource allocation parameters associated with the guard interval-based waveform, wherein the one or more second quantized resource allocation parameters are different from the one or more quantized resource allocation parameters; and
transmitting, to the network entity, one or more messages requesting one or more third quantized resource allocation parameters, wherein the indication of the one or more second quantized resource allocation parameters is received in response to the one or more messages.

26. A method for wireless communications at a network entity, comprising:
transmitting, to a user equipment (UE), one or more first signals that indicate a resource allocation and that indicate a set of guard interval-based waveform parameters for a guard interval-based waveform associated with the UE;
transmitting, to the UE, an indication of one or more quantized resource allocation parameters associated with the guard interval-based waveform;
communicating the guard interval-based waveform with the UE using the one or more quantized resource allocation parameters and the set of guard interval-based waveform parameters;
transmitting, to the UE, an indication of one or more second quantized resource allocation parameters associated with the guard interval-based waveform, wherein the one or more second quantized resource allocation parameters are different than the one or more quantized resource allocation parameters; and
receiving, from the UE, one or more messages requesting one or more third quantized resource allocation parameters, wherein the indication of the one or more second quantized resource allocation parameters is transmitted in response to the one or more messages.

27. The method of claim 25, wherein the one or more quantized resource allocation parameters comprise one or more guard interval length parameters, one or more suppression signal length parameters, or a combination thereof, wherein the one or more quantized resource allocation parameters are quantized according to a quantization grid.

28. The method of claim 27, further comprising:
receiving one or more signals indicating a head suppression signal length in a time domain or a pre-transform domain, a tail suppression signal length in the time domain or the pre-transform domain, or both.

29. The method of claim 26, wherein the one or more quantized resource allocation parameters comprise one or more guard interval length parameters, one or more suppression signal length parameters, or a combination thereof, wherein the one or more quantized resource allocation parameters are quantized according to a quantization grid.

30. The method of claim 29, further comprising:
transmitting one or more signals indicating a head suppression signal length in a time domain or a pre-transform domain, a tail suppression signal length in a time domain or a pre-transform domain, or both.

* * * * *